United States Patent [19]
Yoshikawa et al.

[11] 3,733,513
[45] May 15, 1973

[54] CIRCUITS FOR CENTERING PICTURES ON TELEVISION SCREENS

[75] Inventors: Sadayoshi Yoshikawa; Hiroshi Kawamura, both of Osaka, Japan

[73] Assignee: Hunt Electronics Company, Dallas, Tex.

[22] Filed: Apr. 10, 1970

[21] Appl. No.: 27,391

[30] Foreign Application Priority Data

| | | |
|---|---|---|
| April 30, 1969 | Japan | 44/33955 |
| April 30, 1969 | Japan | 44/33956 |
| April 30, 1969 | Japan | 44/33957 |
| Aug. 26, 1969 | Japan | 44/67365 |
| Sept. 5, 1969 | Japan | 44/70343 |
| Sept. 5, 1969 | Japan | 44/70344 |
| Sept. 5, 1969 | Japan | 44/70345 |

[52] U.S. Cl. ....315/27 TD, 315/29
[51] Int. Cl. ....H01j 29/70
[58] Field of Search ....315/27 R, 27 TD, 315/28, 29

[56] References Cited

UNITED STATES PATENTS

| | | | |
|---|---|---|---|
| 3,489,948 | 1/1970 | Buechel | 315/27 |
| 2,440,418 | 4/1948 | Tourshou | 315/27 |
| 2,905,856 | 9/1959 | Schlesinger | 315/27 |
| 2,396,476 | 3/1946 | Schade | 175/335 |

*Primary Examiner*—Carl D. Quarforth
*Assistant Examiner*—J. M. Potenza
*Attorney*—Posnack, Roberts & Cohen

[57] ABSTRACT

A variety of circuits for centering pictures on the screens of television tubes are characterized by the use of a picture centering variable resistor arranged in a loop including the horizontal and/or vertical deflection coils on said tubes. The variable resistor is connected by a brush or slidable contact with a source of direct current the magnitude and direction of which through the deflection coils controls the positioning of the associated picture. In connection with certain of the aforegoing circuits, provision is also made for high voltage stabilization.

43 Claims, 16 Drawing Figures

INVENTORS
SADAYOSHI YOSHIKAWA
HIROSHI KAWAMURA
BY
Posnack, Roberts & Cohen
ATTORNEYS INVENTORS
SADAYOSHI YOSHIKAWA
HIROSHI KAWAMURA
BY
Posnack, Roberts & Cohen
ATTORNEYS INVENTORS
SADAYOSHI YOSHIKAWA
HIROSHI KAWAMURA
BY
Poonack, Roberts & Cohen
ATTORNEYS INVENTORS
SADAYOSHI YOSHIKAWA
HIROSHI KAWAMURA
BY
Posnack, Roberts & Cohen
ATTORNEYS INVENTORS
SADAYOSHI YOSHIKAWA
HIROSHI KAWAMURA
BY
Posnack, Roberts & Cohen
ATTORNEYS INVENTORS
SADAYOSHI YOSHIKAWA
HIROSHI KAWAMURA
BY
Posnack, Roberts & Cohen
ATTORNEYS INVENTORS
SADAYOSHI YOSHIKAWA
HIROSHI KAWAMURA
BY
Posnack, Roberts & Cohen
ATTORNEYS

INVENTORS
SADAYOSHI YOSHIKAWA
HIROSHI KAWAMURA

BY

Posnack, Roberts & Cohen
ATTORNEYS

INVENTORS
SADAYOSHI YOSHIKAWA
HIROSHI KAWAMURA
BY
Posnack, Roberts & Cohen
ATTORNEYS INVENTORS
SADAYOSHI YOSHIKAWA
HIROSHI KAWAMURA
BY
Posnack, Roberts & Cohen
ATTORNEYS

CIRCUITS FOR CENTERING PICTURES ON TELEVISION SCREENS

BACKGROUND

1. Field of Invention

This invention relates to circuits for positioning pictures displayed on the faces of picture tubes in TV sets, and more particularly to circuits for use in transistorized color television receivers.

This invention also relates to high voltage stabilizing circuits for television receivers and particularly for transistorized color television receivers.

2. Prior Art

In TV sets, pictures sometimes do not appear in proper position on the fluorescent screens on which they are being displayed or are sometimes partly cut off if scanning is effected with an electron beam improperly directed due to an inaccurate setting of the issuing electron gun. For this reason, a positioning arrangement is required for the proper locating of such pictures on the associated screens.

Generally, in black-and-white television receivers, an electron beam is controlled, during deflection by deflecting coils, by means of centering magnets provided outside of the associated picture tube for adjusting the angle at which the beam enters the deflecting region. However, with respect to color TV sets, it is difficult to control electron beams by means of centering magnets because of the disposition of the phosphors for the three colors on the screen and due to the necessary adjustments for enabling the beams to strike the phosphors. Thus, in color TV sets employing vacuum tubes, positioning is effected by controlling properly the magnitude and direction of direct current which is superimposed on the deflecting currents flowing through the deflecting coils.

In the aforementioned technique relating to vacuum-tube type color-television receivers, a d-c current is superimposed on the deflection current in the deflecting coils, and the value and direction of this DC current are suitably varied whereby said positional adjustment is realized. In this kind of arrangement, a bifilar winding is employed as the output secondary winding of the flyback transformer. This output winding, a position-adjustment variable resistor and a deflecting coil are used to constitute a bridge circuit. By varying the position-adjustment variable resistor, imbalance is introduced into the bridge circuit to cause a d-c current to flow in the deflecting coil.

According to this prior art, the position-adjustment variable resistor is connected to the cathode of a damper tube as well as to the anode circuit of the horizontal output tube. Accordingly, a pulse voltage of about 3 to 4kV is unavoidably applied to the position-adjustment variable resistor during the flyback period. This requires the provision of substantial insulation between the position-adjustment variable resistor and the chassis.

In addition, the construction of the flyback transformer inevitably becomes large and complicated due to its bifilar winding. Furthermore, in the transistor type television receiver, it is difficult to supply DC current to the deflecting coil because the S-characteristics compensation capacitor is connected in series with the horizontal deflecting coil. Therefore, said positional-adjustment device utilizing a bridge circuit has not been adapted to transistor television receivers.

In color television receivers, it is necessary to stabilize the high voltage which is to be applied to the anode of the picture tube. If this high voltage is unstable, the picture amplitude is varied, convergence is disturbed, and loose focusing results. This, of course, deteriorates the picture quality. To avoid this, in the usual color television receiver, s shunt regulator tube is disposed in parallel with the anode of the receiving tube. The plate current of the shunt regulator tube is changed in response to variations in the plate current of the picture tube. Thus, the high voltage load is kept constant whereby the high voltage output is stabilized. According to this arrangement, large amounts of X-rays are radiated from the anode of the shunt regulator tube. It is therefore necessary to enclose the regulator tube in a large metallic case for protection against the X-rays. Such construction is not suited for small transistor color television receivers.

There is a possibility of using a semiconductor element instead of the shunt regulator tube. As a practical matter, however, it is extremely difficult to manufacture a semiconductor element that will withstand a high voltage such as 25 to 30kV.

SUMMARY OF INVENTION

The present invention has among its objects the elimination of the foregoing disadvantages regarding positional adjustment of pictures as well as high voltage stabilization.

To achieve the above and other objects of the invention, there is proposed a circuit for use with a picture tube in which a picture is traced on a fluorescent screen by means of an electron beam. The circuit comprises a first means for generating at least one signal relating to the generation of a picture on said screen, and a source of direct current. A loop is provided which is coupled to said source and to said first means. This loop includes deflection coils operatively associated with the picture tube and responsive to the signal of the first means for controlling, at least in part, the generation of a picture on said screen. The loop further includes control means coupled to the source of direct current and controlling the magnitude and direction of flow of the direct current through the loop and thereby through the deflection coils whereby the location of the picture on the picture tube is controlled. Thus, through the deflection coils pass signals which aid in generating the picture on said screen as well as a DC bias which displaces the picture to the left or right (and/or up or down) to center the picture on the screen.

The first means noted above may, for example, be a source of a horizontal deflection signal. Alternatively, the first means may be a source of a vertical deflection signal. Other possibilities exist with respect to said first means which may, for example, be a combination of a source of both horizontal and vertical deflection signals.

In further accordance with the invention, there may be provided a means to generate a high voltage to apply to the anode of the picture tube for the generation of the picture. Such means can be coupled to and actuated by signals in the loop. This high voltage is susceptible of reduction due to certain operations (e.g. brightness control) related to the picture tube whereupon picture size is diminished. In accordance with a feature of the invention, there can further be provided a means coupled to the loop to compensate for reduction of the high voltage thereby to avoid reduction of picture size.

The aforesaid control means is preferably a variable resistor including resistance means connected in series in the loop and provided with a displaceable contact engaged with the resistance means and coupled to the source of direct current so that the source is connected to the loop through the control means and particularly through the displaceable contact or brush associated with the resistance means thereof.

According to further features of the invention, there may be a flyback transformer coupled to the loop and the transformer may include a winding connected in series in the loop. In addition a choke coil may be provided connected in series with the loop.

According to still a further feature of the invention, there may be provided a saturable reactor including a winding connected in series in the loop.

In accordance with another aspect of the invention, a load circuit such as an audio output circuit or a horizontal deflection circuit can be coupled to the loop and direct circuit shunted from the loop into this load circuit. When such a load circuit is provided, a coil may be inserted between the loop and load circuit to protect the latter from alternating current signals generated by the above noted first means. Also a bypass condenser or capacitor may be employed to bypass such alternating current signals. Additionally, there may be provided a second load circuit which is coupled to the loop, these two load circuits being connected to the loop on opposite sides of the control means.

According to still another aspect of the invention, there may be provided a capacitor connected to but outside of the loop and arranged in a series resonance circuit with the deflection coils.

It is to be noted that the invention is particularly advantageous with respect to associated transistor circuitry in connection with which the invention provides a technique for employing a loop circuit in such a manner as to direct a direct current biasing signal in one of two selected directions through the deflection coils associated with the picture tube.

The above and further objects, features and advantages of the invention will be apparent from the detailed description of the various embodiments of the invention which follow hereafter.

According to one embodiment of this invention, a structurally simple flyback transformer can be employed, a saturable reactor being inserted in the low voltage side thereby stabilizing the high voltage. The winding of this saturable reactor is utilized in the adjustment of the horizontal position. As will be explained below, the invention is particularly suited for transistorized color television receivers.

DETAILED DESCRIPTION OF INVENTION

Figures 1, 2:
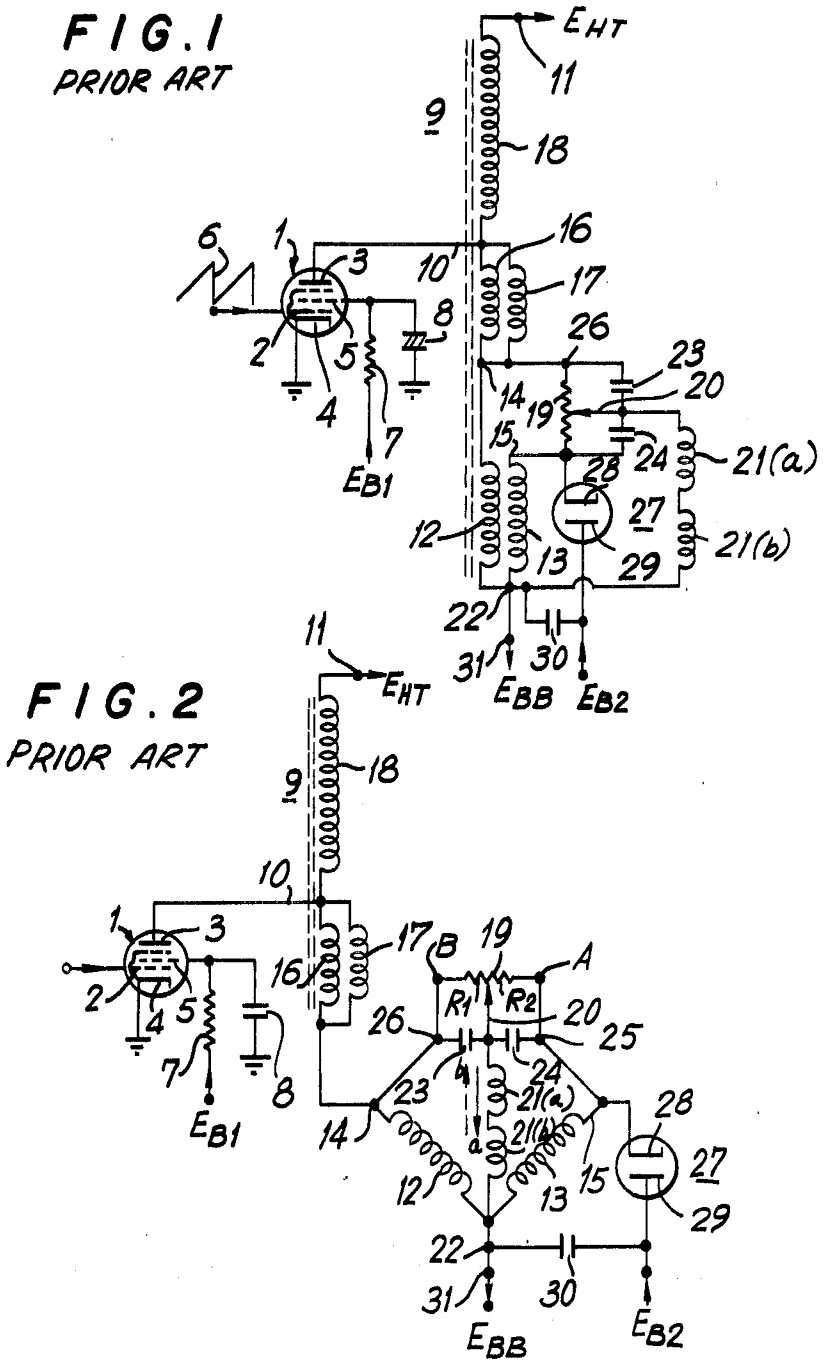
FIG. 1 PRIOR ART, FIG. 2 PRIOR ART
FIG. 1 is a schematic diagram of a horizontal positioning circuit used in conventional color TV sets employing vacuum tubes.
FIG. 2 is a schematic diagram explanatory of the principle of the circuit of FIG. 1.

With reference to FIG. 1, a conventional method of feeding direct current to deflecting coils will next be explained. This method is applied to conventional vacuum-tube color television receivers. In FIG. 1 is shown a circuit for horizontal positioning. This circuit includes output coils in a bifilar winding on a flyback transformer, a variable resistor for centering control, and deflecting coils. These components form a bridge circuit so that direct current may flow through the deflecting coils via a sliding contact with DC voltage produced across the variable resistor.

The circuit shown in FIG. 1 is only part of the overall circuit necessary for positioning a picture in a vacuum-tube color television receiver. All other parts unnecessary for explanation are excluded. In FIG. 1, component 1 is a horizontal output tube including a control grid 2 connected to the preceding stage of a conventional horizontal oscillation circuit which generates a saw tooth voltage as indicated at 6. The anode 3 in tube 1 is connected to an intermediate tap 10 on a flyback transformer 9 (the horizontal output transformer), while the screen grid 5 is connected to the positive terminal of a d-c power source $EB_1$ through a resistor 7 and is grounded through a by-pass capacitor 8.

The upper terminal 11 of the flyback transformer provides a pulse voltage produced during flyback time in horizontal scanning and increased by means of a winding 18. Terminal 11 is connected to a conventional high-voltage rectifier (not shown) to apply high voltage to the anode of the associated picture tube (not shown).

Transformer 9 has bifilar windings 12 and 13 which have equal resistances. These two coils 12 and 13 are connected at one end to each other and are connected at their other ends to a variable resistor 19 providing a centering control. A sliding contact 20 on the variable resistor 19 is connected to the junction 22 of said coils 12 and 13 through horizontal deflecting coils 21(*a*) and (*b*) mounted on the neck of the picture tube. Between the sliding contact 20 and the two ends 25 and 26 of the variable resistor are connected capacitors 23 and 24 for by-passing horizontal deflecting current.

The cathode of a damper tube 27 is connected to junction 25 of the coil 13 and the variable resistor 19.

The anode 29 of tube 27 is connected to the positive terminal of a d-c power source $EB_2$ which supplies power thereto. Between the anode 29 and junction 22 of the flyback transformer 9 is connected a boosting capacitor 30 for producing a boosting voltage which is applied to a terminal 31 for use, for example, as a power source for a vertical oscillation circuit. The flyback transformer 9 is also provided with bifilar windings 16 and 17 for the matching of the horizontal deflecting coils 21(*a*) and (*b*).

The principle of the circuit arrangement of FIG. 1 is shown in FIG. 2, where like numbers designate like parts in FIG. 1. The variable resistor 19 for the centering control is divided by the sliding contact 20 into resistances $R_1$ and $R_2$. The function of the centering control will next be explained with reference to this diagram.

When the product of the resistance $R_2$ and the resistance in the coil 12 is less than the product of the resistance $R_1$ and the resistance in the coil 13 due to a moving of the sliding contact 20 to point A on the variable resistor 19, the bridge is unbalanced. Then, direct current flows through the anode of the horizontal output tube 1 by way of damper tube 27, terminal 25, point A, resistance $R_2$, sliding contact 20, horizontal deflecting coils 21(*a*) and (*b*), coil 12, and coils 16, 17 from the power source $EB_2$. In this case, the direct current flows through the horizontal deflecting coils 21(*a*) and (*b*) in the direction of arrow a, and is superimposed on the deflecting current to produce magnetic fields in the horizontal deflecting coils. The coils deflect the electron beam in one direction with the result of shifting the entire picture in that direction on the screen.

When the product of the resistance $R_1$ and the resistance in the coil 13 is less than the product of the resistance $R_2$ and the resistance in the coil 12 due to a reverse moving of the sliding contact 20 to point B on the variable resistor 19, the bridge is unbalanced. Then, direct current flows through the anode of the horizontal output tube 1 by way of damper tube 27, coil 13, deflecting coils 21(*a*) and (*b*), sliding contact 20, resistance $R_1$, point B, terminal 26, and coils 16, 17 in this order from the power source $EB_2$. In this case, the direct current flows through the horizontal deflecting coils 21(*a*) and (*b*) in the direction of an arrow *b* (which is the reverse of arrow *a*) and is superimposed on the deflecting current to produce magnetic fields in the horizontal deflecting coils. The coils deflect the electron beam in the reverse direction with the result of shifting the entire picture horizontally and reversely on the screen.

In this manner horizontal positioning is achieved. In picture tubes having normal electron beams scanning without any deviation, pictures are reproduced in their normal position on the screen without centering control means. Accordingly, the only requirement is to balance the bridge circuit by proper setting of the sliding contact 20 on the variable resistor 19 for positioning. In other words, when $R\times\times$ (coil 13) $= R_2 \times$ (coil 12), no direct current flows through the deflecting coils 21(*a*) and (*b*) and pictures are produced in their normal position on the screen.

In vacuum-tube color television receivers such as described above, high insulation is essential between the variable resistor of the centering control and the chassis because of the generation of pulse voltages of 3 to 4 KV on the cathode of the damper tube during flyback time in scanning operations. Furthermore, flyback transformers themselves are intricate in structure and large in size because of the bifilar windings. This means that there is no adaptability to transistorized color television receivers, in which resonant capacitors are connected in series with the deflecting coils, particularly in transistor circuits for horizontal deflection. Therefore, a bridge circuit such as described above cannot be used because of the difficulty encountered in the supply of direct current.

Figure 3:
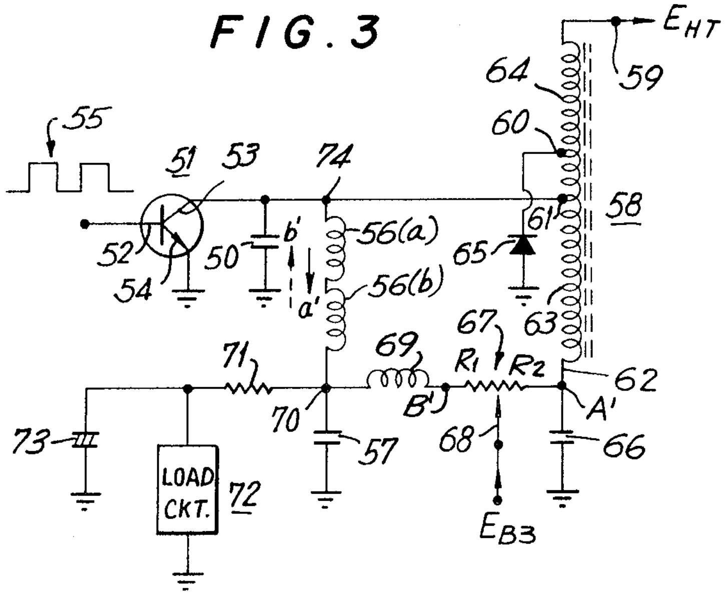
FIG. 3 is a schematic diagram of a circuit provided in accordance with one embodiment of this invention.

The present invention provides for elimination of such disadvantages as described above, and provides a picture positioning device most suitable for color TV receivers particularly for transistorized picture receivers, permitting easy adjustment at low voltage by using a flyback transformer which is simple in structure. With reference to FIG. 3, one embodiment of this invention will next be explained.

In FIG. 3, component 51 is a transistor for horizontal output. The base electrode 52 of this transistor is connected to the preceding stage of a conventional driver for a horizontal oscillation circuit and receives square waves 55. This transistor 51 performs on-off switching operations in response to square waves 55.

The collector electrode 53 of transistor 51 is connected to a center tap 61 of an autotransformer 58 functioning as a flyback transformer (horizontal output transformer) and also is grounded through a series circuit formed of horizontal deflecting coils 56(*a*) and (*b*) and a capacitor 57 which constitutes a series resonance circuit therewith for S compensation blocking any d-c component. The collector electrode is also grounded through a resonant capacitor 50 connected in parallel with the series resonance circuit for shaping commonly-known flyback pulse wave forms. The emitter electrode of the transistor 51 is also grounded.

The center tap 60 of the flyback transformer 58 is connected to the cathode of a damper diode 65, the anode of which is grounded. The upper terminal 59 of the transformer 58 is provided for applying pulse voltage, produced on the collector of the transistor 51 during flyback time in horizontal scanning and increased by a portion of the winding 64, to a high-voltage rectifier (not shown) which delivers high voltage to the anode of a picture tube (not shown). The lower terminal 62 on the transformer 58 is grounded through a bypass capacitor 66 for blocking any d-c component, and is also connected to a junction 70 of the horizontal deflecting coils 56(*a*) and (*b*) by and the capacitor 57 through a series circuit formed by a variable resistor 67 serving as a centering control and a coil 69.

A sliding contact 68 on the variable resistor 67 is connected to the positive terminal of a d-c power source $EB_3$. The coil 69 is used for preventing the linearity for horizontal deflection from being disturbed when the sliding contact 68 is moved to the B′ side. Coil 69 influences the a-c impedance at the junction 70 and presents a high impedance to 15,734 Hz for horizontal deflection. This coil 69 may be replaced by a resistor or the equivalent or may be omitted if linearity for horizontal deflection can be neglected.

A resistor 71 is connected at one end to the junction 70 and is grounded at other end through a capacitor 73. It is also connected to a load circuit 72. The resistor 71 and the capacitor 73 provide a decoupling action by which the a-c impedance of the junction 70 is kept free from the harmful influence of deflecting current, which may otherwise flow through the load circuit. The load circuit 72 can be, for example, a circuit for vertical deflection or for audio output.

Picture positioning in accordance with the invention will next be explained with reference to FIG. 3. The variable resistor 67 used for the centering control is divided by the sliding contact 68 into resistances $R_1$ and $R_2$. When the sliding contact 68 is moved to point A' on the variable resistor 67, the sum of the resistance $R_2$ and the resistance in the winding 63 of the flyback transformer 58 becomes smaller than the sum of the resistance $R_1$ and the resistances in the coil 69 and the horizontal deflecting coils 56(*a*) and (*b*) 56. Consequently, direct current supplied from the power source $EB_3$ flows to the collector electrode 53 of the horizontal output transistor 51 through sliding contact 68, resistance $R_2$, point A', coil 63, and terminal 61 in this order. The sum of the resistance $R_2$ and the resistances in the coil 63 and the horizontal deflecting coils 56(*a*) and (*b*) is determined so as to be far smaller than the sum of the resistance $R_1$ and the resistance in the coil 69. Then the direct current described above is shunted from the point 74 to the horizontal deflecting coils 56(*a*) and (*b*) in the direction of arrow *a'* and supplied to the load circuit 72 through the resistor 71. Thus, the direct current is superimposed on deflecting current to produce magnetic fields in the horizontal deflecting coils 56(*a*) and (*b*) which move the electron beam in one direction with the result of shifting the entire picture horizontally in one direction on the screen.

When the sliding contact 68 is moved in reverse to point B' on the variable resistor 67, the sum of the resistance $R_1$ and the resistances in the coil 69 and the horizontal deflecting coils 56(*a*) and (*b*) becomes smaller than the sum of the resistance $R_2$ and the resistance in the coil 63. Thus, direct current from the power source $EB_3$ flows to the collector electrode 53 of the horizontal output transistor 51 through sliding contact 68, resistance $R_1$, point B', coil 69, point 70, and horizontal deflecting coils 56(*a*) and (*b*) in this order. In this case the direct current flows through the coils 56(*a*) and (*b*) in the direction of an arrow *b'* which is reverse to that of the arrow *a'*. Consequently, magnetic fields produced in the horizontal deflecting coils 56 (*a*) and (*b*) move the electron beam reversely with the result of shifting the entire picture horizontally in the reverse direction. This direct current is shunted from the point 70 and supplied to the load circuit 72 through the resistor 71.

In this manner, picture positioning is achieved by controlling the direction and magnitude of direct current flowing through the horizontal deflecting coils (*a*) and (*b*). For picture tubes in which scanning is normally performed by electron beams, the variable resistor used for the centering control is adjusted so that no direct current flows through the horizontal deflecting coils 56 (*a*) and (*b*). Thus, pictures can be produced in their normal position on the screen.

Figure 4:
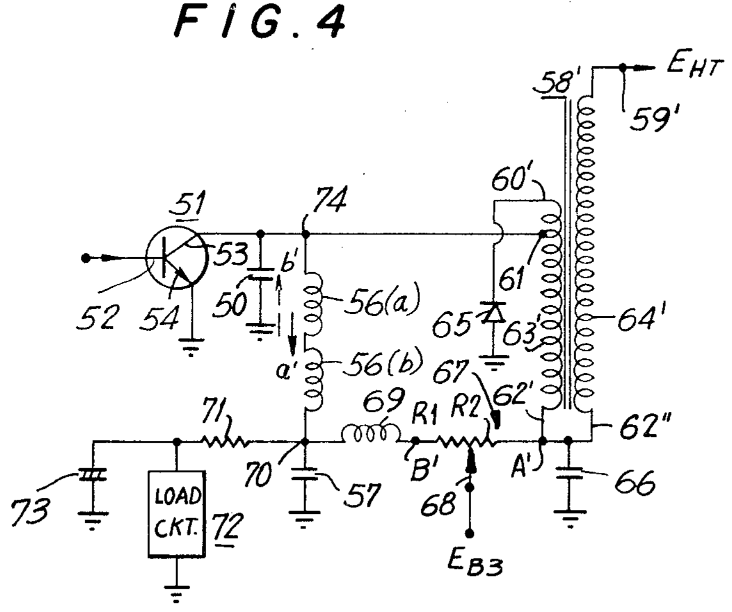
FIG. 4 is a schematic diagram of another embodiment of the invention.

FIG. 4 shows another embodiment of this invention, wherein a horizontal output transformer 58' is provided with separate windings 63' and 64', and adjustment is made in a manner similar to that in FIG. 3.

In the present invention as described above, to the junction of horizontal deflecting coils and a resonant capacitor to form a series resonance circuit therewith is inserted a variable resistor which is used as a centering control and a loop circuit is formed of leg portions which comprise a first leg portion including at least the horizontal deflecting coils, a second leg portion including at least said variable resistor and a third leg portion including at least the transformer winding(s). To the junction of the horizontal deflecting coils and the capacitor is connected a load circuit. Direct current can be supplied from a sliding contact on the variable resistor to a horizontal output element and said load circuit through said loop. Horizontal picture positioning is performed by proper control of the magnitude and direction of direct current flowing through the horizontal deflecting coils by means of the variable resistor. Thus, picture positioning in transistorized color television receivers, which hitherto has been difficult to effect, is greatly simplified.

The resistance of the variable resistor can be of a very small value such as 5 to 10 ohms, which cause neither considerable change in the voltage applied in the variable range of the sliding contact nor does it result in any trouble with the circuit. The flyback transformer is made of simple construction, and the variable resistor may be used at a low voltage of about 100V without special high insulation.

Figure 5:
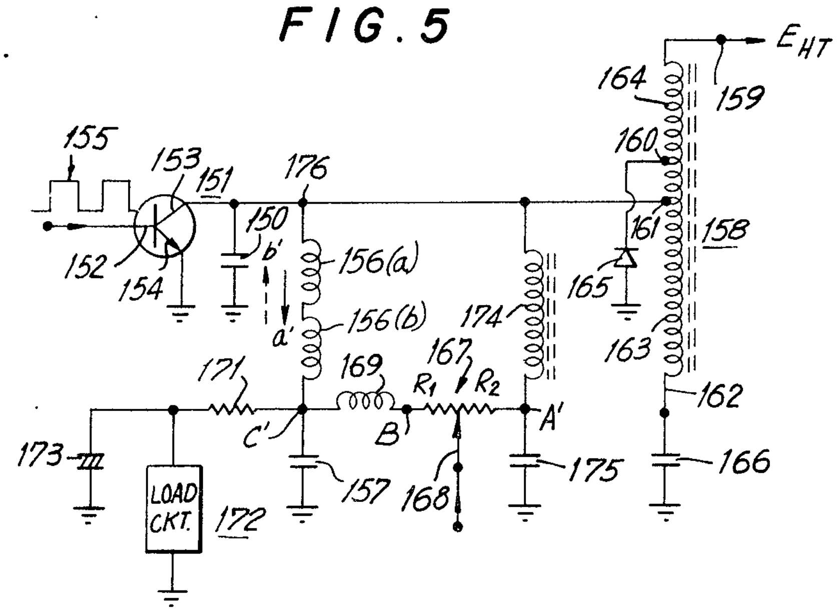
FIG. 5 is a schematic diagram of a circuit in accordance with a further embodiment of this invention.

In FIG. 5 component is a horizontal output transistor, the base electrode 152 of which is connected to the preceding stage of a driver in a conventional horizontal oscillation circuit and receives square waves 155. This transistor 151 performs on-off or switching functions with such square waves as has been noted hereinabove.

The collector electrode 153 of output transistor 151 is connected to a center tap 161 on an autotransformer such as flyback transformer 158 (horizontal output transformer). The collector is grounded through a series circuit formed by horizontal deflecting coils 156(*a*) and (*b*) and a capacitor 157 which constitutes a series resonance circuit therewith for S compensation blocking any d-c component. The collector electrode 153 is also grounded through a resonant capacitor 150 which is connected in parallel with the series circuit to shape well known flyback pulse waveforms, and through a series circuit of an inductance element 174 such as a saturable reactor or choke coil and a bypass capacitor 175 for blocking any d-c component.

An intermediate tap 160 on the flyback transformer 158 is connected to the cathode of a conventional damper diode 165, the anode of which is grounded. The upper end terminal 159 on the transformer 158 is for providing a pulse voltage produced at the collector of the transistor 151 and increased by the winding 164 for application to a high-voltage rectifier (not shown) which applies high voltage to the anode of a picture tube (not shown). The lower end terminal 162 is grounded through a bypass and blocking capacitor 166.

Between junction C' of the horizontal deflecting coils 156(*a*) and (*b*) and the capacitor 157 and junction A' of the inductance element 174 for current supply and the capacitor 175 is connected a series circuit formed by a coil 169 and a variable resistor 167 which is used as a centering control. The variable resistor 167 has a sliding contact 168 which is connected to the positive terminal of a d-c power source $EB_3$. The coil 169 is used to prevent the linearity of the horizontal deflection signal from being disturbed by changes in the a-c impedance at junction C', which might otherwise be caused when the sliding contact 168 is moved to the point B'. The coil 169 has a high impedance with respect to 15,750 Hz which is used for horizontal deflec- A sliding contact 296 on the variable resistor 295 is connected to the upper terminal 294 of the secondary winding 292 and the tertiary winding 293 through vertical deflecting coils 301(*a*) and (*b*). Between the sliding contact 296 and two ends 297 and 298 of the variable resistor are connected capacitors 299 and 300 for respectively bypassing vertical deflecting currents. The junction 297 of the primary winding 291 and the secondary winding of the transformer 290 has a terminal 302 used for the supply of current to other circuits. The windings 292 and 293, which are bifilar, are used for matching the vertical deflecting coils 301(*a*) and (*b*).

Figure 6:
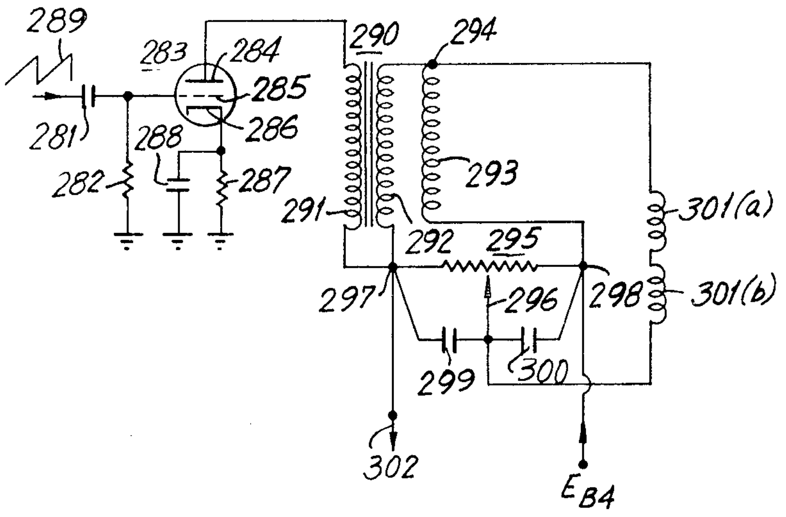
FIG. 6 PRIOR ART
FIG. 6 is a circuit diagram of a device for vertical positioning in conventional color television receivers employing vacuum tubes.
Figure 7:
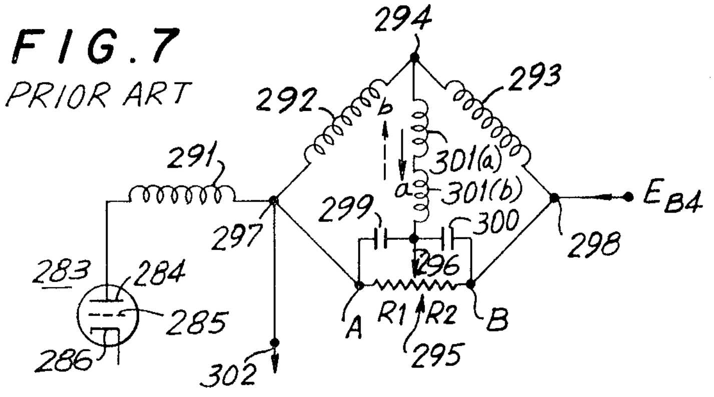
FIG. 7 PRIOR ART
FIG. 7 shows the principle of the circuit of FIG. 6.

The principle of the circuit of FIG. 6 is shown more clearly in FIG. 7. As readily understood, the circuit forms a bridge which operates to supply direct current from the power source EB4 to the vertical deflecting coils 301(*a*) and (*b*), and supply power to the anode 284 of the vertical output tube 283 through the transformer windings.

In FIG. 7, the variable resistor 295, which is used for vertical positioning, is divided into resistances R1 and R2 by the sliding contact 296. When the sliding contact 296 is moved to point A on the variable resistor 295, the product of the resistance R1 and the resistance in the coil 293 becomes smaller than the product of the resistance R2 and the resistance in the coil 292. Thus, the bridge circuit is unbalanced, and direct current flows from the power source EB4 to the anode of the vertical vertical output tube 283 through point 298, coil 293, point 294, vertical deflecting coils 301(*a*) and (*b*), sliding contact 296, resistance R1, point A, point 297, and coil 291 in this order. In other words, the direct current flows through the vertical deflecting coils 301(*a*) and (*b*) in the direction of arrow a producing a magnetic field therein to displace scanning electron beams in one direction. As a result, the entire picture is shifted vertically in one direction on the screen.

When the sliding contact 296 is moved in opposite direction to point B on the variable resistor 295, the product of the resistance R2 and the resistance in the coil 292 becomes smaller than the product of the resistance R1 and the resistance in the coil 293 with the result of unbalancing the bridge circuit. Thus, direct current flows from the power source EB4 to the anode 284 of the vertical output tube 293 through point 298, point B, resistance R2, sliding contact 296, vertical deflecting coils 301(*a*) and (*b*), point 294, coil 292, point 297, and coil 291 in this order. In this case, the direct current flows through the vertical deflecting coils 301(*a*) and (*b*) in the direction of an arrow *b*. This current is superimposed on deflecting current therein, thereby producing magnetic fields in the vertical deflecting coils 301(*a*) and (*b*) to displace the associated scanning electron beams with the result of shifting the entire picture vertically and in selected opposite directions on the screen. In this manner positioning is achieved.

In picture tubes with properly positioned electron beams, pictures are shown in their proper position on the screen without adjustment for positioning the pictures. In this case, the only requirement is to balance the bridge circuit by properly setting the sliding contact 296 on the variable resistor 295. That is, when $$R1 \times (\text{coil } 293) = R2 \times (\text{coil } 292),$$

no direct current component flows through the vertical deflecting coils 301(*a*) and (*b*) and the pictures are retained in their normal proper positions on the screen.

As described above, in vacuum-tube type color television receivers the secondary and tertiary windings of a vertical output transformer must be bifilar, and a variable resistor for the positioning operation must be provided with a bypass capacitor for the frequency of 60 Hz for vertical deflection. Thus, such circuits are complicated. Furthermore, in transistorized color television receivers, deflecting current is fed from vertical deflecting coils back to the stage of the driver for vertical deflection for compensation of linearity. There is no suitable method for inserting vertical deflecting coils in a bridge circuit as in the vacuum-tube type of circuit.

This invention eliminates the disadvantages described above and provides a device for positioning pictures, which is simple in structure and suitable for transistorized color television receivers.

Another embodiment of this invention will next be explained with reference to FIG. 8 wherein is shown a circuit which avoids the disadvantages inherent in FIGS. 6 and 7.

Figure 8:
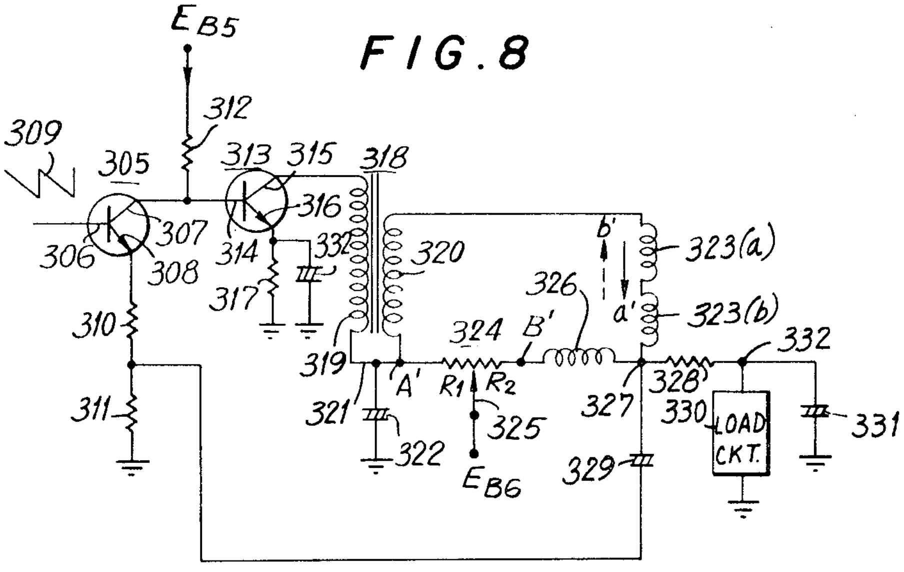
FIG. 8 is a circuit diagram of a further embodiment of this invention.

In FIG. 8, component 305 is a transistor for vertical drive. To the base electrode 306 of transistor 305 is applied saw tooth waves as shown at 309 from the preceding stage of a vertical oscillation circuit. The collector electrode 307 of this transistor 305 is connected to the positive terminal of a d-c power source $EB_5$ providing a current supply through a resistor 312 and is also connected directly to the base electrode 314 of a transistor 313 provided for vertical output. The emitter electrode 308 of the transistor 305 is grounded through a series circuit consisting of resistances 310 and 311.

The collector electrode 315 of the vertical output transistor 313 is connected to apply a saw tooth vertical output to the upper terminal of the primary winding 319 of a vertical output transformer 318. The emitter electrode 316 is grounded through a parallel circuit consisting of a resistance 317 and a bypass capacitor 332.

The lower terminals of the primary and secondary windings 319 and 320 of the vertical output transformer 318 are connected at a junction 321 and grounded by a bypass capacitor 322. Between the upper and lower terminals of the secondary winding 320 are connected a series circuit of vertical deflecting coils 323(*a*) and (*b*), choke coil 326, and variable resistor 324 and a loop is formed by leg portions which comprise a first leg portion including at least the vertical deflecting coils 323(*a*) and (*b*), a second leg portion including at least the variable resistor 324 and a third leg portion including at least the choke coil 326. A sliding contact 325 on the variable resistor 324 is connected to the positive terminal of a d-c power source $EB_6$.

Junction 327 of the coil 326 and the vertical deflecting coils 323(*b*) is connected to a load circuit 330 through a decoupling resistance 328, and junction 332 of the resistance 328 and the load circuit 330 is grounded through a decoupling capacitor 331.

The power source $EB_6$ supplies direct current to the vertical output transistor 313 and the load circuit 330 through the loop described above. The choke coil 326 is inserted to prevent the linearity in the vertical deflection signal from being affected by a change in the a-c impedance at the junction 327 when the sliding contact 325 is moved to point B′ on the variable resistor 324. This choke coil has a high impedance to the frequency of 60 Hz used for vertical deflection. Said coil can be tion or may be replaced by a resistor or the equivalent or may even be omitted in case the linearity of the horizontal deflection signal can be neglected.

A resistor 171 is connected at one end to junction C' and is grounded at its other end through a capacitor 173. Resistor 171 is also connected to a load circuit 172. The resistor 171 and the capacitor 173 are provided for their decoupling action due to which no deflecting current is supplied to the load circuit 172 so that the a-c impedance at junction C' is not badly affected. The load circuit 172 can be a vertical deflection circuit or audio output circuit.

Operation of the circuit arrangement of FIG. 5 will next be explained. The variable resistor 167 used as the centering control is divided into resistances R1 and R2 by the sliding contact 168 as indicated in the drawing. When the sliding contact 168 is moved to the point A' on the variable resistor 167, the sum of the resistance R2 and the resistance in the inductance element 174 becomes smaller than the sum of the resistance R1 and the resistances in the coil 169 and the horizontal deflecting coils 156(*a*) and (*b*). Then, most of the direct current flows from the power source $EB_3$ to the collector electrode 153 of the horizontal output transistor 151 through sliding contact 168, resistance R2, point A', and saturable reactor 174.

In this case, the sum of the resistance R2, and the resistances in the inductance element 174 becomes smaller than the sum of the resistance R1 and the resistances in the coil 169 and the horizontal deflecting coils 156(*a*) and (*b*). Thus, the current supplied from the power source $EB_3$ to the transistor 153 is shunted at the point 176 and flows through the horizontal deflecting coils 156(*a*) and (*b*) in the direction of an arrow *a'* and is supplied to the load circuit 172 through the resistance 171. This direct current is superimposed on the deflecting current to produce magnetic fields in the horizontal deflecting coils 156(*a*) and (*b*), which move the electron beam in the associated picture tube to the right or left with the result of shifting the entire picture horizontally in either direction on the screen.

When the sliding contact 168 is moved in the opposite direction to the point B' on the variable resistor 167, the sum of the resistance R1 and the resistances in the coil 169 and the horizontal deflecting coil 156(*a*) and (*b*) becomes smaller than the sum of the resistance R2 and the resistance in the saturable reactor 174. Then, most of the direct current flows from the power source EB3 to the collector electrode 153 of the horizontal output transistor 151 through sliding contact 168, resistance R1, point B', coil 169, point C', and horizontal deflecting coils 156(*a*) and (*b*). Under these conditions, part of the current is supplied from the point C' to the load circuit 172 through the resistance 171.

The direct current flowing through the horizontal deflecting coils 156(*a*) and (*b*) in the direction of an arrow *b'* is superimposed on the deflecting current therein to produce magnetic fields in the horizontal deflecting coils 156(*a*) and (*b*) which displace the electron beam in the reverse direction with the result of shifting the entire picture horizontally and in reverse on the screen from the displacement described above.

Thus, proper positioning of pictures can be accomplished by controlling the direction and magnitude of direct current flowing through the horizontal deflecting coils 156(*a*) and (*b*). In picture tubes in which scanning is accomplished properly without adjustment, pictures can be maintained in their normal positions by adjusting the variable resistor 167 so that no direct current flows through the horizontal deflecting coils 156(*a*) and (*b*).

As described above relative to this embodiment of the invention, an inductance element such as a saturable reactor or a choke coil is connected in parallel with the winding on a flyback transformer, and between the junction of horizontal deflecting coils and a capacitor forming a series resonance circuit therewith is inserted a variable resistor such that, as a result, a loop is formed by leg portions which comprise a first leg portion including at least horizontal deflecting coils, a second leg portion including at least the variable resistor and a third leg portion including at least the inductance element, the junction of the horizontal deflecting coils and the capacitor being connected to a load circuit in terms of direct current, said variable resistor having a sliding contact connected to a d-c power source so that current may be supplied to a horizontal output element and said load circuit through said loop. Horizontal positioning of pictures is effected by controlling the direction and magnitude of the direct current flowing through the horizontal deflecting coils by adjusting the sliding contact on the variable resistor.

Furthermore, in accordance with the invention, no d-c component flows through the flyback transformer due to the use of the inductance element, and thus the transformer core is free from magnetic saturation and can be small in size and simple in construction without the necessity for bifiler windings.

Still furthermore, as in the prior embodiments, the variable resistor used for the centering control has a very small resistance such as, for example, 5 to 10 ohms, which will not cause any appreciable change in the voltage supplied in the variable range of the sliding contact thereby preventing circuits from being damaged.

In addition, no special consideration is required for the insulation of the variable resistor because it is used at a low voltage of about 100V.

Referring next to FIGS. 6 and 7 a conventional method will first be explained with respect to vertical adjustment.

FIG. 6 shows a device for vertical positioning in color television receivers employing vacuum tubes, component 281 is a coupling capacitor through which saw tooth waves are applied to the control grid 285 of a vertical output tube 283 for its excitation. The anode 284 of the tube 283 is connected to the upper terminal of the primary winding 291 of a vertical output transformer 290 to supply the saw tooth output thereto. The cathode 286 is grounded through a parallel circuit consisting of a resistor 287 and a by-capacitor 288.

The lower terminal of the primary winding 291 of the vertical output transformer 290 is connected to the lower terminal of the secondary winding 292. The upper terminal of the secondary winding 292 is connected to the upper terminal 294 of the tertiary winding 293. A junction 297 of the primary winding 291 and the secondary winding 292 is connected to the lower terminal 298 of the tertiary winding through a variable resistor 295 which is used for vertical positioning. Terminal or junction 298 is connected to the positive terminal of a d-c power source EB4.

replaced by a resistor or the equivalent, or may be omitted in cases where the linearity can be neglected. The load circuit 330 can, for example, be an audio output circuit to which current for vertical deflection is prevented from flowing by a decoupling circuit formed of the resistance 328 and the capacitor 331. The junction 327 is connected to the junction of resistances 310 and 311 connected to the emitter of the vertical drive transistor 305 through a capacitor 329 for negative feedback and blocking direct current.

Picture positioning with the above arrangement will next be explained. The variable resistor 324 used for positioning is divided into resistances $R_1$ and $R_2$ by the sliding contact 325. When the sliding contact 325 is moved to point A' on the variable resistor 324, the sum of the resistance $R_1$ and the resistances in the coil 320 and the vertical deflecting coils 323(*a*) and (*b*) becomes smaller than the sum of the resistance $R_2$ and the resistance in the coil 326. Then, direct current is supplied from the power source $EB_6$ to the collector electrode 315 of the transistor 313 for vertical output mostly through sliding contact 325, resistance $R_1$, point A', point 321, and coil 319 in this given order and is shunted from the point A' to be supplied to the load circuit 330 through coil 320, vertical deflecting coils 323(*a*) and (*b*), point 327, and resistance 328 in this order. Thus, the direct current flows through the vertical deflecting coils 323(*a*) and (*b*) in the direction of an arrow *a'* and is superimposed on the deflecting current therein, thereby producing magnetic fields to displace scanning electron beams in one direction. As a result the entire picture is shifted vertically in that direction on the screen.

When the sliding contact 325 is reversely moved to the point B' on the variable resistor 324, the sum of the resistance $R_2$ and the resistances in the coil 326, vertical deflecting coils 323(*a*) and (*b*) and coil 320 becomes smaller than the resistance $R_1$. Then, direct current flows from the power source $EB_6$ to the collector electrode 315 of the vertical output transistor 313 mostly through sliding contact 325, resistance $R_2$, point B', coil 326, point 327, vertical deflecting coils 323(*a*) and (*b*), coil 320, point A', point 321, and coil 319 in this order. Current is shunted from the point 327 to the load circuit 330 through the resistance 328. Thus, the direct current flows through the vertical deflecting coils 323(*a*) and (*b*) in the direction of an arrow b' and is superimposed on the deflecting coils thereby producing magnetic fields to displace scanning electron beams in reverse to the aforedescribed direction. As a result, the entire picture is shifted vertically and in reverse direction.

In this manner, proper positioning of pictures can be made by controlling the magnitude and direction of direct current flowing through the vertical deflecting coils. In picture tubes with electron beams, scanning without deviation, pictures can be maintained properly in position merely by adjusting the variable resistor in such a way that no direct current flows through the vertical deflecting coils 323(*a*) and (*b*). Furthermore, saw tooth waves for vertical deflection are fed back negatively to the driver stage mostly through the capacitor 329 without being impeded in other circuits and thus vertical linearity is not degraded.

As has been described above, this embodiment of the invention includes a loop formed at least of the secondary winding of a transformer for vertical output, vertical deflecting coils, and a variable resistor which has a sliding contact connected to a d-c power source. The loop is connected to a load circuit in terms of direct current, so that the direct current is supplied from a d-c power source to a vertical output element and the load circuit through the loop, and is superimposed on deflecting current flowing through the vertical deflecting coils. Vertical positioning of pictures is achieved by controlling the magnitude and direction os this direct current by means of the variable resistor.

Figure 9:
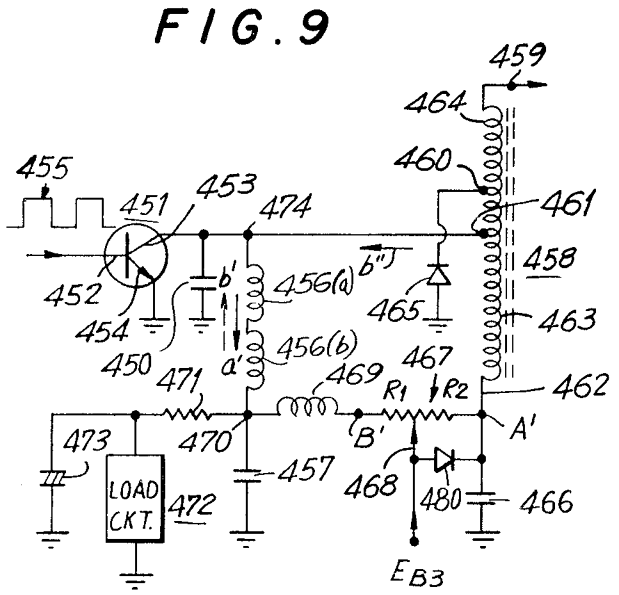
FIG. 9 is a schematic diagram of a circuit in accordance with another embodiment of this invention.
Figure 10:
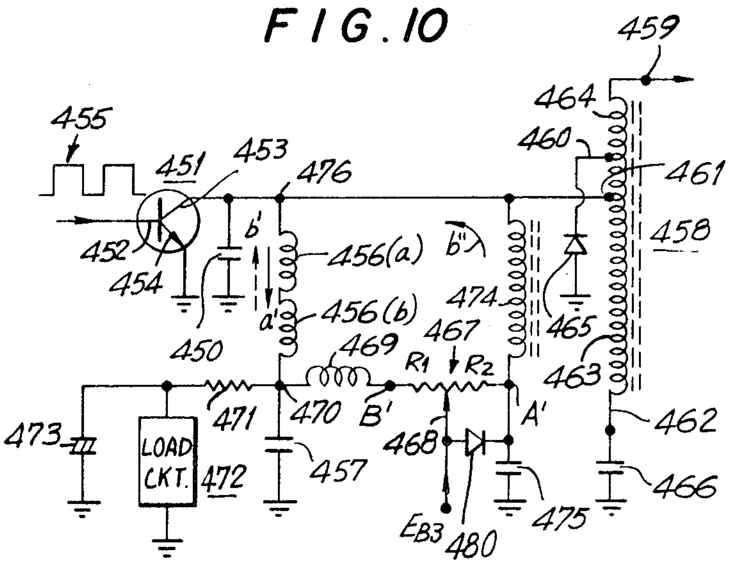
FIG. 10 is a schematic diagram of another embodiment thereof.

The embodiments of FIGS. 9 and 10 are similar to those of FIGS. 3 and 4. In addition, the embodiments of FIGS. 9 and 10 comprise a diode 80 which plays an important part as mentioned in greater detail hereinafter. This diode is connected between the sliding contact 468 of the variable resistor 467 and the lower end terminal 462 of the transformer 458 or the junction A'.

Referring next to the circuit arrangement of FIG. 9, the operation for picture positioning will be explained. The variable resistor 467 used as the centering control is divided by the sliding contact 468 into resistances $R_1$ and $R_2$. When the sliding contact 468 is moved to point A' on the variable resistor 467, the sum of the resistance $R_2$ and the resistance in the winding 463 of the flyback transformer 458 becomes smaller than the sum of the resistance $R_1$ and the resistances in the coil 469 and the horizontal deflecting coils 456(*a*) and (*b*). Consequently, direct current supplied from the power source $EB_3$ flows to the collector electrode 453 of the horizontal output transistor 451 through sliding contact 468, resistance $R_2$, point A', coil 463, and terminal 461 in this order. The sum of the resistance $R_2$ and the resistances in the coil 463 and the horizontal deflecting coils 456(*a*) and (*b*) is so determined as to be far smaller than the sum of the resistance $R_1$ and the resistance in the coil 469.

Then the direct current described above is shunted from the point 474 through the horizontal deflecting coils 456(*a*) and (*b*) in the direction of an arrow *a'* and is supplied to the load circuit 472 through the resistor 471. Thus, the direct current is superimposed on the deflecting current to produce magnetic fields in the horizontal deflecting coils 456(*a*) and (*b*) which displace an electron beam in one direction with the result of shifting the entire picture horizontally in this one direction on the associated screen.

When the sliding contact 468 is reversely moved to point B' on the variable resistor 467, the sum of the resistance $R_1$ and the resistances in the coil 469 and the horizontal deflecting coils 456(*a*) and (*b*) becomes smaller than the sum of the resistance $R_2$ and the resistance in the coil 463. Thus, direct current from the power source $EB_3$ flows to the collector electrode 453 of the horizontal output transistor 451 through sliding contact 468, resistance $R_1$, point B', coil 469, point 470, and horizontal deflecting coils 456(*a*) and (*b*) in this order.

In this case the direct current flows through the coils 456(*a*) and (*b*) in the direction of an arrow *b'* which is reverse to the arrow *a'*. Consequently, magnetic fields produced in the horizontal deflecting coils 456(*a*) and (*b*) displace the electron beam in reverse direction with the result of shifting the entire picture horizontally in the reverse direction. Direct current is shunted from the point 470 and supplied to the load circuit 472 through the resistor 471.

When the diode 480 is not connected in the circuit arrangement of FIG. 9, the following phenomenon may be caused even after picture-positioning. When the sliding contact 468 is placed by the point B' and anode current of the picture tube is increased on adjustment of brightness or due to variation in the value of the input original color signals, the load of the high voltage rectifier is reduced. In proportion to the increment of the anode current, direct current supplied to the horizontal output transistor 451 and flowing in the direction of arrow *b'* also is increased. Therefore, the entire picture is undesirably shifted. The nearer the sliding contact 468 is placed to the point B', the more remarkably such a phenomenon can be caused. However, when the sliding contact 468 is placed closer to point A', the phenomena is greatly reduced.

When the diode 480 is connected as shown in the circuit arrangement of FIG. 9, the operation is accomplished as follows. When the sliding contact 468 is placed near the point B' on the variable resistor 467, most of direct current from the power source $EB_3$ flows in the direction of the arrow *b'* while, in fact, the remainder of direct current flows in the direction of arrow *b''* through resistance $R_2$ and the winding 463 of the flyback transformer 458. If the beam current or the plate current or the plate current of a picture tube is increased, direct current flowing in the direction of both arrows *b'* and *b''* will also be increased in proportion to its increment. Voltage drop is caused across the resistance $R_2$ by the current of the arrow *b''* so that, when the voltage becomes higher than the forward building-up voltage of the diode 480, it conducts. Therefore, the voltage across resistance $R_2$ does not increase more than the building-up voltage of the diode 480, and then the desirable current increasing component is bypassed to flow into the winding 463 through the diode 480. By such means, the undesirable increment of current in the direction of the arrow *b'* is suppressed.

On the other hand, when the sliding contact 468 is placed near the point A', most of direct current and its undesirable increasing current flows through a small resistance $R_2$ and the winding 463 to the collector electrode 453 of the horizontal output transistor 451, and then the direct current is shunted from the point 474 to the horizontal deflecting coils 456(*a*) and (*b*) in the direction of the arrow *a'*. Therefore, the undesirable component of increasing current shunted to the coils 456(*a*) and (*b*) is so small that it hardly affects the picture position. That is, the undesirable phenomenon, which will be caused on the screen of the picture tube by means of brightness variation under these conditions, is very small.

In this manner, picture positioning can be achieved properly by controlling the direction and magnitude of direct current flowing through the horizontal deflecting coils 456(*a*) and (*b*). For picture tubes in which scanning is acceptably performed by electron beams, the variable-resistor centering control is adjusted so that no direct current flows through the horizontal deflecting coils 456(*a*) and (*b*). Thus, pictures can be maintained in their desired position on the screen.

FIG. 10 shows another embodiment of this invention wherein an inductance element 474 such as a saturable reactor or choke coil, which replaces the winding 463 of the horizontal output transformer 458 in FIG. 9 as a direct current path, is used in the direct current loop. The lower end terminal 462 of the transformer 458 is connected to the ground by means of capacitor 466 for blocking any d-c component. Adjustment is made almost in the same manner as in FIG. 9.

In the present embodiment between the junction of horizontal deflecting coils and a resonant capacitor forming a series resonance circuit therewith and the terminal of the winding of a horizontal output transformer or another inductance element such as a saturable reactor or choke coil is inserted a variable resistor serving as a centering control. A loop is formed by leg portions which comprise a first leg portion including at least the horizontal deflecting coils, a second leg portion including at least said variable resistor and a third leg portion including at least transformer winding(s) for horizontal deflection or another inductance element. To the junction of the horizontal deflecting coils and the capacitor is connected a load circuit. Thus, direct current can be supplied from the sliding contact on the variable resistor to a horizontal output element and said load circuit through said loop. Horizontal picture positioning is effected by control of the magnitude and direction of the direct current flowing through the horizontal deflecting coils by means of adjustment of the variable resistor.

Further, in the present embodiment, a diode is connected between the junction of the variable resistor and the winding of the output transformer for horizontal deflection or another inductance element and the power source supplying direct current. The anode of the diode is connected to the power source or the sliding contact of the variable resistor. This reduces undesirable shifting of picture position caused by brightness adjustments.

Thus, picture positioning in transistorized color television receivers is facilitated. It should be noted that the resistance of the variable resistor can be reduced to very small values such as 5 to 10 ohms, which will cause neither considerable or undesirable changes in the voltage applied within the range of the sliding contact nor trouble with the circuit. The flyback transformer can be a simple structure, and the variable resistor may be used at low voltages of about 100V without special precautions for high insulation. By way of example, the forward building-up voltage of the diode can be about 0.7 Volt to achieve results which are desirable.

Figure 11:
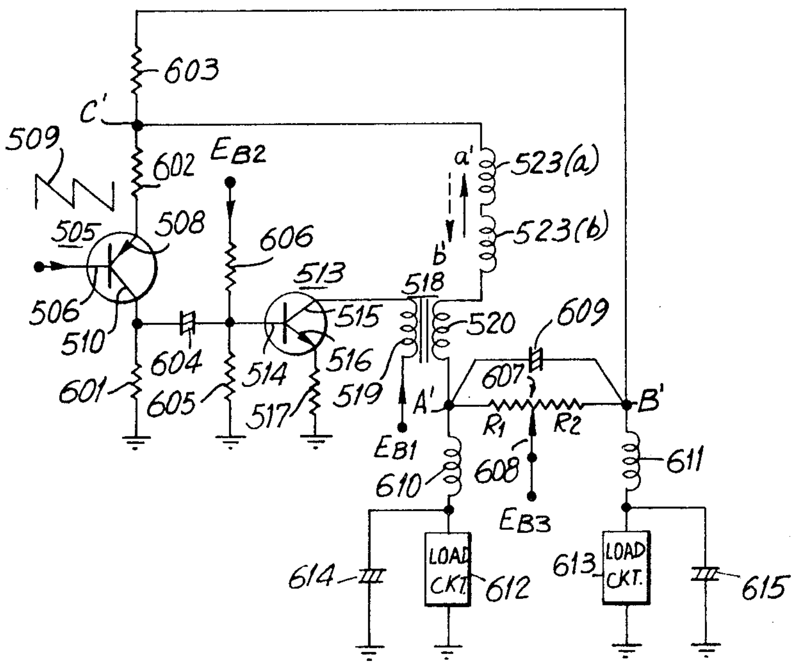
FIG. 11 is a schematic diagram of a further embodiment of this invention.

In FIG. 11 is shown an improvement over the prior art illustrated in FIGS. 6 and 7. In this embodiment, component 505 is a transistor for vertical drive. To the base electrode 506 of the transistor is applied saw-tooth waves as shown at 509 originating in the preceding stage of a vertical oscillation circuit for exciting the transistor. The collector electrode 510 of this transistor 505 is grounded through a load resistance 601 and also is connected to the base electrode 514 of a vertical-output transistor 513 by means of a coupling capacitor 604 to couple saw-tooth waves to the transistor 513. The base electrode 514 of the transistor 513 is grounded through a resistance 605 and is also connected to the positive terminal of a d-c power source $EB_2$ through another resistance 606 so that bias voltage is applied to the base. The emitter electrode 516 of the transistor 513 is grounded through a resistance 517. The collector electrode 515 of the vertical-output transistor 513 is connected to the positive terminal of a d-c power source $EB_1$ through the primary winding 519 of a vertical output transformer 518 through which direct current is supplied to the transistor 513.

The upper terminal of the secondary winding 520 of the transformer 518 is connected the emitter electrode 508 of the vertical-drive transistor 505 through vertical deflecting coils 523(*a*) and (*b*) and a resistance 602. The lower terminal of the secondary winding 520 is connected to junction C' of the resistance 602 and the vertical deflecting coil 523(*a*) through a variable resistor 607 used for picture positioning and a resistance 603.

A capacitor 609 for by-passing vertical deflecting current is connected in parallel with the resistor 607. The lower terminal of the secondary winding 520 is also connected to a load circuit 612 through a coil 610. The junction of the coil 610 and the load circuit 612 is grounded by means of a by-passing capacitor 614. A junction B' of the capacitor 609 and the variable resistor 607 is connected to a load circuit 613 through a coil 611. Junction of the coil 611 and the load circuit 613 is grounded by means of a by-passing capacitor 615.

A sliding contact 608 on the variable resistor 607 is connected to the positive terminal of a d-c power source $EB_3$. The load circuit 612 and 613 may be resistors or other circuits in the receiver. The coils 610 and 611 suppress vertical deflecting current flowing into the individual load circuits 612 and 613.

Positioning with the above arrangement will next be explained. The variable resistor 607 used for positioning control is divided into resistances $R_1$ and $R_2$ by the sliding contact 608. When the sliding contact 608 is moved to point A' on the variable resistor 607, the sum of the resistance $R_1$ and the resistances in the secondary winding 520 becomes smaller than the sum of the resistance $R_2$ and 603. Direct current is then supplied from the power source $EB_3$ to the load circuit 613 mostly through sliding contact 608, resistance $R_1$, point A', secondary winding 520, vertical deflecting coils 523(*a*) and (*b*), resistance 603, point B' and coil 611 in the order named, and is shunted from the point A' to the load circuit 612 through the coil 610. Thus, the direct current flows through the vertical coils 523(*a*) and (*b*) in the direction of arrow *a'* and is superimposed on the vertical deflecting current therein, thereby producing magnetic fields in the coils 523(*a*) and (*b*) to displace the scanning electron beams in one direction. As a result, the entire picture is shifted vertically in that direction on the screen.

When the sliding contact 608 is moved in opposite direction to point B' on the variable resistor 607, the sum of the resistance $R_2$ and 603 becomes smaller than the sum of the resistance $R_1$ and the resistance in the secondary winding 520. Then, direct current flows from the power source $EB_3$ to the load circuit 612 mostly through sliding contact 608, resistance $R_2$, point B', resistance 603, deflecting coils 523(*a*) and (*b*) secondary winding 520, point A' and coil 610, in the order named, and is shunted from the point B' to the load circuit 613 through the coil 611. Thus, the direct current flows through the vertical deflecting coils 523(*a*) and (*b*) in the direction of arrow *b'*, and is superimposed on deflecting current therein, thereby producing magnetic fields to displace the scanning electron beams. As a result, the entire picture is shifted vertically and in reverse direction to that previously described.

Further, in both cases the current flowing from the d-c power source $EB_3$, is shunted from the point C' to the emitter 508 of the vertical-drive transistor 505.

Furthermore, vertical deflecting current of saw-tooth wave form flows through secondary winding 120, vertical deflecting coils 523(*a*) and (*b*) resistance 603 and at least capacitor 609. When the deflecting current flows across the resistance 603, voltage is developed at the point C'. The voltage is applied to the emitter 508 of the vertical-drive transistor 505; that is, the current for vertical deflection is fed back to the driver stage so that vertical linearity may be compensated.

As described above, this embodiment includes a loop which is made of leg portions which comprise a leg portion including at least the secondary winding of a transformer for vertical output, another leg portion including at least the vertical deflecting coils and further another leg portion including at least a resistance for current feedback to the drive stage and a variable resistor, which has a sliding contact connected to a d-c power source and which has two end terminals coupled to individual load circuits in terms of direct current. Direct current is supplied from the d-c power source to the load circuits through the loop circuit and is superimposed on deflecting current flowing through the vertical deflecting coils. Vertical positioning of pictures is achieved by controlling the magnitude and direction of this direct current by means of the variable resistor.

In picture tubes in which scanning is effected properly with regular electron beams, pictures can be retained in proper position on the screen by adjusting the variable resistor so that no direct current flows through the vertical deflecting coils.

Further this embodiment includes another d-c power source supplying direct current to the output electrode of the vertical output element through the primary winding of the vertical-output transformer, which is separated from the secondary winding thereof in terms of direct current.

Voltage of the d-c power source is higher than that of the source connected to the loop circuit. For example, the latter is about 10 to 15 volts, and the former is about 100 volts. No capacitor for blocking direct current from the high-voltage d-c power source is used so that deflecting current may be fed back easily to the vertical drive stage. Furthermore, in this embodiment also, transformers for vertical output need not use bifilar windings and, as a result, can be of simple structure.

Figure 12:
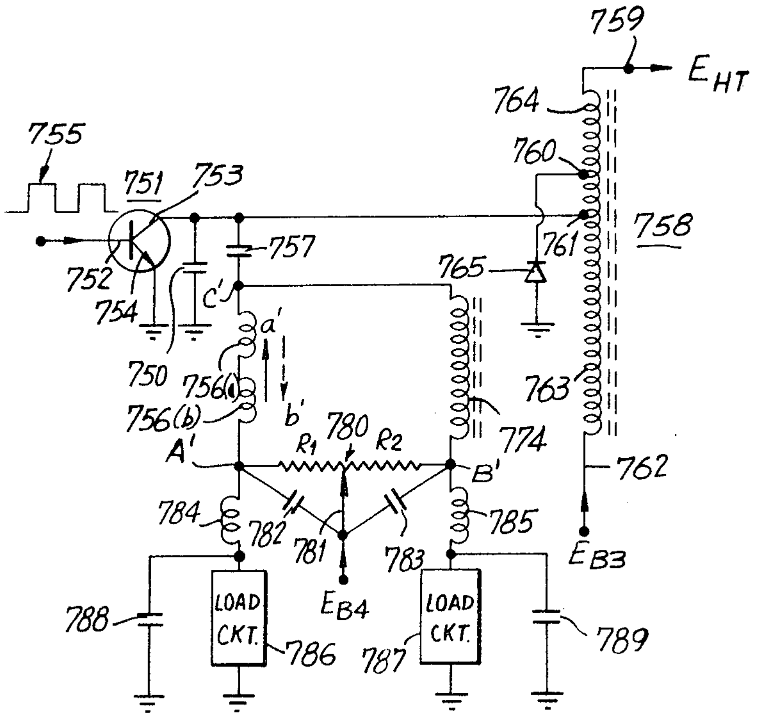
FIG. 12 is a schematic diagram of still another embodiment of this invention.

The embodiment in FIG. 12 is an improvement over the prior art shown in FIGS. 1 and 2. In FIG. 12 the collector 753 of output transistor 751 is connected to a center tap 761 of an autotransformer operating as a flyback transformer 758 (the horizontal output transformer) and is connected to a load circuit 786 through a series circuit formed by a capacitor 757, horizontal deflecting coils 756(*a*) and (*b*) and a coil 784, wherein the horizontal deflecting coils 756(*a*) and (*b*) and the capacitor 757 form a series resonance circuit for S-curve compensation.

The junction of the coil 784 and the load circuit 786 is grounded through a capacitor 788. The coil 784 suppresses horizontal deflecting current flowing into the load circuit 786, while the capacitor 788 by-passes the current. The load circuit 786, which is supplied with direct current, may be a resistor or another circuit in the receiver such as, for example, a vertical deflection circuit or audio output circuit. Also, the collector 753 is grounded through a resonant capacitor 750 for shaping the commonly-known fly-back pulse voltage waveforms by higher harmonics.

Junction C' of the capacitor 757 and the deflecting coil 756(*a*) is connected to a load circuit 787 through a series circuit consisting of an inductance element 774 such as a saturable reactor or choke coil and a coil 785. The junction of the coil 785 and the load circuit 787 is grounded through a capacitor 789.

Herein the coil 785 is of the same type as the coil 784, and also the capacitor 789 is of the same type as the capacitor 788. Further, the load circuit 787 is of the same type as the load circuit 786. Between junction A' of the horizontal deflecting coil 756(*b*) and the coil 784 and junction B' of the inductance element 774 and the coil 785 is connected a variable resistor 780 to serve as a centering control. Variable resistor 780 has a sliding contact 781 which is connected to a positive d-c power source $EB_4$. Between the sliding contact 781 and junctions A' and B' are respectively connected capacitors 782 and 783 for bypassing horizontal deflecting current.

A center tap 760 of the flyback transformer 758 is connected to the cathode of a conventional damper diode 765, the anode of which is grounded. The upper end terminal 759 of the transformer 758 is provided in order to supply pulse voltage produced at the collector of the transistor 751 during flyback time and boosted by means of winding 764 to a conventional high-voltage rectifier (not shown), which applies high voltage to the anode of a picture tube (not shown). Further, the lower end terminal 762 of the transformer 758 is connected to a d-c power source $EB_3$ so that direct current is supplied to the collector electrode 753 of the horizontal output transistor 751 through winding 763.

In the circuit arrangement of FIG. 12, the positioning operation is as next explained. The variable resistor 780 for centering control is dividend into resistances $R_1$ and $R_2$ by the sliding contact 781. When the sliding contact 781 is moved to point A' on the variable resistor 780, the sum of the resistance $R_1$ and the resistances in the horizontal deflecting coils 756(*a*) and (*b*) and the inductance element 774 becomes smaller than the resistance $R_2$. Then, most of direct current flows from the power source $EB_4$ to the load circuit 787 through sliding contact 781, resistance $R_1$, point A', horizontal deflecting coils 756(*a*) and (*b*) point C', inductance element 774, point B', and coil 785, in the order named. At the same time, direct current is shunted from the point A' and is applied to the load circuit 786 through the coil 784. In this case, the direct current in the horizontal deflecting coils 756(*a*) and (*b*) flows in the direction of arrow *a'* and is superimposed on the deflecting current therein to produce magnetic fields in the coils 756(*a*) and (*b*), which displace an electron beam to the right or left with the result of shifting the entire picture horizontally in either direction on the screen.

When the sliding contact 781 is moved in reverse direction to the point B' on the variable resistor 780, the sum of the resistance $R_2$ and the resistances in the inductance element 774 and the horizontal deflecting coils 756(*a*) and (*b*) becomes smaller than the resistance $R_1$. In this case most of the direct current flows from the source $EB_4$ to the load circuit 786 through sliding contact 781, resistance $R_2$, point B', inductance element 774, point C', horizontal deflecting coils 756(*a*) and (*b*), point A', and coil 784, in the order named. At the same time, direction current is shunted from the point B' and is applied to the load circuit 787 through the coil 785. In this case, the direct current in the horizontal deflecting coils 756(*a*) and (*b*) flows in the direction of arrow *b'* and is superimposed on horizontal deflecting current therein to produce magnetic fields in the coils 756(*a*) and (*b*) which displace the electron beam in reverse direction with the result of shifting the entire picture horizontally and in reverse direction on the screen.

As described above, proper positioning of pictures can be effected by controlling the direction and magnitude of direct current flowing through the horizontal deflecting coils 756(*a*) and (*b*). In picture tubes in which the scanning is already effected properly by the electron beams, pictures can be retained in their normal position by adjusting the variable resistor so that no direct current flows through the horizontal deflecting coils 756(*a*) and (*b*).

As described above, in this embodiment, there are connected to an output electrode of a horizontal output element a capacitor and horizontal deflecting coils, in the order named, which form a series resonance circuit therewith for S-curve compensation. A loop circuit is formed of leg portions which comprise a first leg portion including at least the horizontal deflecting coils, a second leg portion including at least an inductance element such as a saturable reactor or choke coil and a third leg portion including at least a variable resistor.

Each terminal of said variable resistor is connected to an individual load circuit in terms of direct current, said variable resistor having a sliding contact connected to a d-c power source so that current is supplied to said load circuits through said loop circuit. Horizontal positioning of pictures is effected by controlling the direction and magnitude of the direct current flowing through the horizontal deflecting coils by adjusting the sliding contact on the variable resistor.

In accordance with the invention, direct current flowing from a d-c power source through a loop circuit is blocked by a capacitor provided for S-curve compensation so that it is not shunted to the horizontal output element, into which direct current flows from another d-c power source through the winding of a flyback transformer. Therefore, if the direct current flowing into the horizontal output element varies up adjustment of brightness in the picture tube, the positioning circuit is not affected by the variation, so that proper setting of pictures on the screen is maintained. Furthermore, in accordance with the invention, the flyback transformer can be made simple in structure without the necessity for bifilar windings. Still further, the variable resistor used for the centering control again has a very small resistance, such as, for example, 5 to 10 ohms, so that it will not cause any undesirable change in the voltage supplied from the d-c power source in the variable range of the sliding contact. In addition, no special consideration is required for insulation of the variable resistor because it is used at a low voltage of about 100V.

Figures 13, 14:
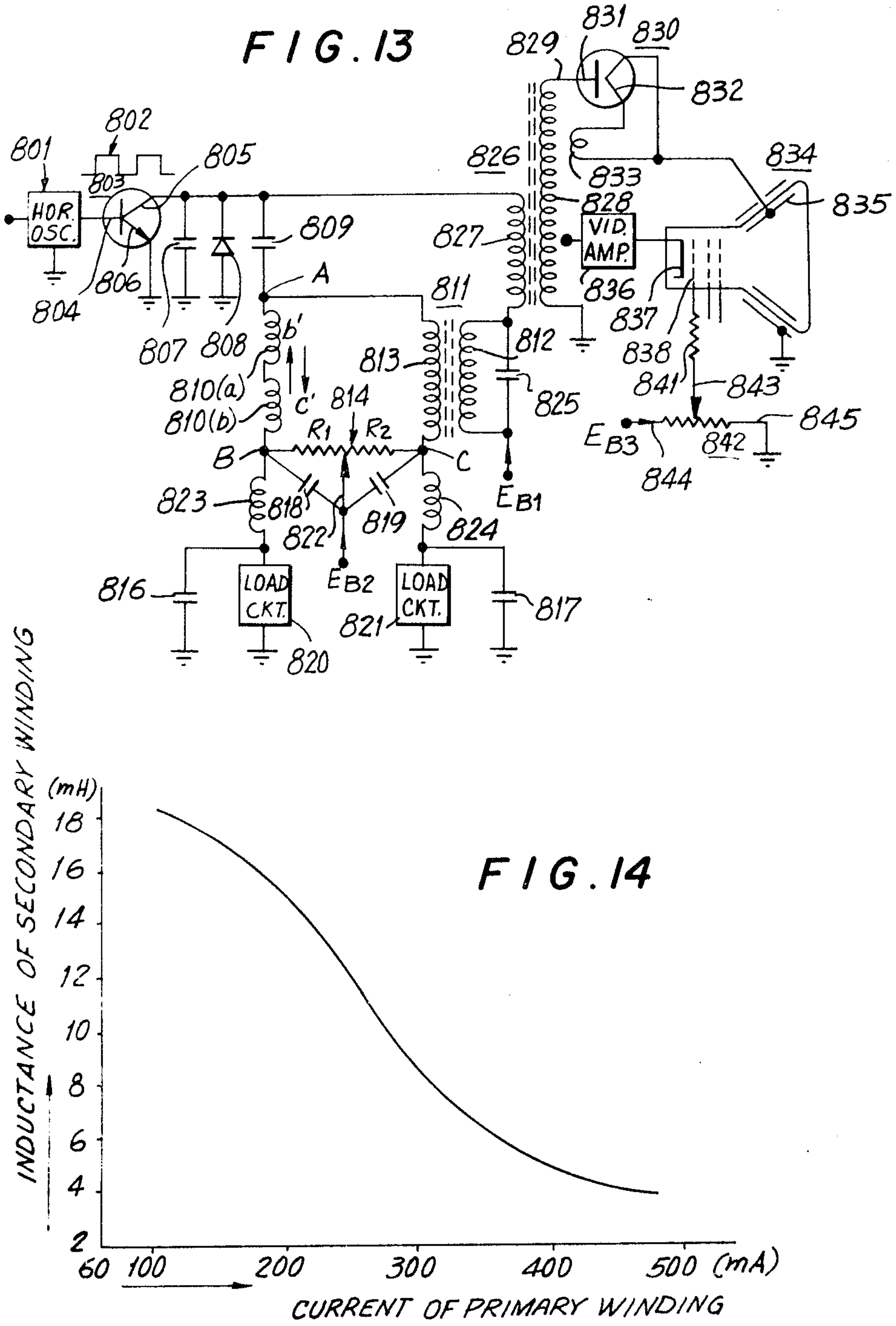
FIG. 13 is a schematic diagram illustrating another device embodying this invention.
FIG. 14 is a characteristic curve illustrating the operation of this invention.

FIG. 13 shows the horizontal deflection and high voltage supply circuits of a television receiver, wherein the reference 801 denotes a known horizontal oscillator circuit consisting of a blocking oscillator and a horizontal drive circuit. The output terminal of the oscillator circuit 801 is connected to the base 804 of a horizontal output transistor 803. The emitter 806 of the transistor 803 is grounded, and its collector 805 is connected to the upper terminal of the primary winding 827 of a flyback transformer 826.

The collector electrode 805 of the output transistor 803 is grounded by way of a resonant capacitor 807 which provides a waveform formed by superimposing a high harmonic wave on the flyback pulse voltage. Said collector electrode 805 is also connected to the cathode of a damper diode 808. The anode of the damper diode 808 is grounded. The collector electrode 805 is further connected to a load circuit 820 by way of a series circuit consisting of a capacitor 809, horizontal deflecting coils 810(*a*) and (*b*) and a coil 823.

The deflecting coils 810 are installed in the vicinity of the neck of the picture tube. The point at which the coil 823 is connected to the load circuit 820 is grounded by way of a capacitor 816. The capacitor 809, in combination with the horizontal deflecting coils 810, makes up a series resonant circuit for compensating the S-characteristics. The coil 823 is employed to block the horizontal deflection current, and the capacitor 816 is for bypass use.

A circuit operated for class A amplification, such as vertical deflecting circuit or the audio output circuit, is used as the load circuit 820. A d-c current is supplied to this load circuit 820 in a manner to be described hereinafter. The connection point A of the S-characteristics compensator resonant capacitor 809 and the deflecting coils 810 is connected to a load circuit 821 via a series circuit consisting of the secondary winding (controlled winding) 813 of a saturable reactor 811 and a coil 824. The connection point of the coil 824 and the load circuit 821 is grounded via a capacitor 817. The coil 824 is similar to the coil 823; the load circuit 821 is similar to the load circuit 820; and the capacitor 817 is similar to the capacitor 816.

A variable resistor 814 is connected between the lower terminal B of the deflecting coil 810 and the lower terminal C of the secondary winding 813 of the saturable reactor 811. A brush 822 is connected to a positive d-c source $E_{B2}$. This brush 822 is connected to the terminals of a resistant body 814 by way of capacitors 818 and 819. These capacitors 818 and 819 are used for bypassing the horizontal deflection current.

The lower terminal of the primary winding 827 of the flyback transformer 826 is connected to a positive d-c source $E_{B1}$ through a parallel circuit consisting of the primary winding (control winding) 812 of the saturable reactor 811 and a bypass capacitor 825. The d-c source $E_{B1}$ supplies its DC current to the collector of the horizontal output transistor 803 by way of the primary winding 812 of the saturable reactor 811 and the primary winding 827 of the flyback transformer 826.

The secondary winding of the flyback transformer has its upper terminal connected to the anode 831 of a high voltage rectifier tube 830. The cathode of the rectifier tube 830 is of the direct heating type and is heated by the tertiary winding 833 of the flyback transformer 826. The cathode of the rectifier tube 830 is connected to the anode 835 of an image receiving tube 834. For convenience of explanation, a black and white picture tube 834 is shown. It is to be noted, however, that the invention can be adapted to either color or black and white picture tubes.

A known video amplifier circuit 836 is connected to the cathode 837 of the picture tube 834. The first grid 838 of the picture tube is connected to a brush 843 of a brightness-control variable resistor 842 via a resistor 841. One end of the resistor 842 is connected to a d-c source $E_{B3}$ and the other end 845 is grounded.

The above circuit is normally operated in such manner that a video signal is applied from the video amplifier 836 to the cathode 837 of the picture tube 834 whereby an electron beam whose intensity is dependent on the brightness-control variable resistor 842 is generated. On the other hand, a horizontal drive pulse 802 is generated at the output terminal of the horizontal oscillator circuit 801. This output pulse 802 is then applied to the base electrode 804 of the horizontal output transistor 803. Thereupon, the transistor 803 initiates a switching action to operate the circuit consisting of the horizontal deflecting coils 810, resonant capacitor 807, S-characteristics compensator capacitor 809, flyback transformer 826 and damper diode 808 to cause a saw-tooth wave current to flow in the horizontal deflecting coils 810. As a result, a magnetic field is produced in these coils to deflect the electron beam in the horizontal direction in known manner.

In the flyback transformer 826, a pulse voltage generated at the collector 805 during the flyback period (namely, when the transistor 803 is in the non-conducting state) is boosted and delivered from the terminal 829. The boosted voltage is rectified by the rectifier tube 830 and is then applied to the anode 835 of the picture tube 834 in which the rectified voltage is smoothed to become a high d-c voltage by virtue of the capacitive structure of the anode 835. This high voltage serves to accelerate the electron beam.

The circuit of this invention includes a vertical deflecting coil which is to generate a magnetic field for causing the electron beam to scan in the vertical direction, and also a vertical deflecting circuit for causing current to flow in the vertical deflecting coil. The operations of these known circuits are not explained herein since no modification is made of these circuits.

The positional adjusting operation will be explained below by referring to FIG. 13. The resistance values divided by the brush 822 of the variable resistor 814 are assumed to be $R_1$ and $R_2$. When the brush 822 of the variable resistor 814 is brought near point B, the sum of the resistance values of the resistor $R_1$, deflecting coils 810 and the secondary winding of the saturable reactor 811 becomes smaller than that of the resistor $R_2$. When this occurs, most of the d-c current from the DC source $E_{B2}$ goes to the load circuit 821 by way of brush 822, resistor $R_1$, point B, deflecting coils 810, point A, secondary winding 813, point C and coil 324. A part of this current is shunted at point B and supplied to the load circuit 820 through the coil 823. As a result, a DC current flows in the deflecting coils 810 in the direction of arrow *b'*. This d-c current is superposed on the deflecting current and a magnetic field is produced in the horizontal deflecting coils 810 to displace the electron beam in one direction. Thus the whole picture is moved in a selected horizontal direction with respect to the picture screen.

When the brush 822 of the position-adjustment variable resistor 814 is brought near point C, the sum of the resistance values of the resistor $R_2$, secondary winding 813 and deflecting coils 810 becomes smaller than that of the resistor $R_1$. As a result, most of the d-c current from the DC source $E_{B2}$ flows into the load circuit 820 by way of brush 822, resistor $R_2$, point C, secondary winding 813, point A, horizontal deflecting coils 810, point B and coil 823. A part of this current is shunted at point C and supplied to the load circuit 821 through the coil 824. As a result, a d-c current flows in the deflecting coils 810 in the direction of arrow $c'$. The magnetic field produced in the horizontal deflecting coils 810 by the d-c current superposed on the deflection current serves to displace the electron beam in the reverse direction from that described above. Thus, the whole picture is moved on the screen in the reverse direction with respect to the previous operation.

By thus adjusting the direction and value of the DC current flowing in the horizontal deflecting coils 810, it is possible to determine a suitable position of the picture on the screen. When a picture tube in which the electron beam is properly positioned is used, it is merely necessary to adjust the variable resistor so that no d-c current flows in the horizontal deflecting coil. By this adjustment, a picture can be retained in the desired position on the picture screen.

It is known that there is the following relationship between the high voltage and the deflection current:

$$i_{pp} \alpha \sqrt{E_{HT}} \cdot \sin(\theta/2) \qquad (1)$$

where $E_{HT}$ : anode voltage of picture tube, namely the high voltage $i_{pp}$ : horizontal deflection current $\theta$ : deflection angle of an image receiving tube.

This relationship is important in connection with the operation for stabilizing the high voltage.

There is also the relationship:

$$i_{pp} = (V_{CC} \cdot t_s/L_y) \qquad (2)$$

where $L_y$ : inductance of horizontal deflecting coil $V_{CC}$ : power source voltage $i_{pp}$ : horizontal deflection current $t_s$ : scanning period (e.g. 52.5$\mu$ sec).

The pulse voltage $V_{CP}$ produced at the collector of the horizontal output transistor is expressed by the following equation:

$$V_{CP} = 2\pi f_r \cdot L_y \cdot i_{PF} + V_{CC} \qquad (3)$$

where $\pi$ : 3.14

$i_{PF}$ : peak value of the collector current of the horizontal output transistor (This peak value is half the value of the horizOntal deflection current $i_{pp}$).

$$f_r : (1/2\pi \sqrt{L_y \cdot C}) \qquad (4)$$

$C$ : capacitance value of the resonant capacitor connected thereto in parallel with the horizontal deflecting coils.

Based on the above conditions, the embodiment of the invention shown in FIG. 13 under normal operating conditions is as follows. The collector current of the horizontal output transistor 803 is determined by the d-c source $E_{B1}$. In this case, the inductance $L_X$ of the secondary winding 813 produced by the d-c current flowing in the primary winding 812 of the saturable reactor 811 has a certain definite value. The inductance $L'_y$ which is the combination of the inductances $L_X$ and $L_y$ of the horizontal deflecting coils 810 is connected a-c-wise to the collector electrode 805 of the transistor 803. In this operation, the peak value $i'_{pp}$ of the current flowing in the parallel circuit of the secondary winding 13 and the deflecting coils 810 is calculated by the following equation based on Equation 1:

$$i'_{pp} = (V_{CC}/L'_y) \cdot t_s = 2i'_{PF} \qquad (5)$$

where $i'_{PF}$ : peak value of the collector current of the transistor 3.

The resonant frequency $f'_r$ of the parallel circuit and the capacitor 807 is:

$$f'_r = (1/2\pi \sqrt{L'_y \cdot C}) \qquad (6)$$

The pulse voltage $V'_{CP}$ produced at the collector electrode 805 of the horizontal output transistor 803 is expressed by the following equation based on Equation 3:

$$V'_{CP} = 2\pi f'_r \quad L'_y \cdot i'_{PF} + V_{CC} \qquad (7)$$

Accordingly, the high voltage is determined by the value of $V'_{CP}$. The horizontal deflection current $i_{pp}$ is as follows:

$$i_{pp} = i'_{pp} - i_X \qquad (8)$$

where $i_X$ : current flowing in the secondary winding of the saturable reactor 11.

The high voltage stabilizing operation will be explained below by referring to FIG. 13. When the brush 843 of the brightness control variable resistor 842 is moved to the side of d-c source $E_{B3}$ and thus the bias between the first grid and cathode of the picture tube 834 is decreased to increase the brightness on the screen, or when the video signal applied from the video amplifier circuit 836 approaches the white level, the anode current or the beam current $I_k$ increases as a whole and, as a result, the high voltage $E_{HT}$ being applied to the anode 835 is about to begin increasing. At this moment, the d-c current flowing in the primary winding 812 of the saturable reactor 811 increases in proportion to the beam current. As a consequence thereof, the inductance $L_X$ of the secondary winding 813 of the saturable reactor 811 decreases. Since the inductance is connected in parallel with the inductance $L_y$ of the horizontal deflecting coils 810, the combined inductance $L'_y$ also decreases. As a result, $i'_{PF}$ and $f'_r$ are increased according to Equations 5 and 6. Consequently, the pulse voltage $V'_{CP}$ takes an increasing turn according to Equation 7.

Because this pulse voltage is boosted by the flyback transformer 826 and rectified by the rectifier tube 830 and then given to the anode 835 of the picture tube 834, the would-be decrement of the anode voltage is compensated, and thus the high voltage is kept constant. When the brush 843 of the brightness control variable resistor 842 is moved toward the ground side and the bias between the first grid and cathode of the picture tube 834 is increased to darken the picture screen, or when the whole level of the video signal applied from the video amplifier circuit 836 approaches the black level, the anode current or the beam current $I_k$ decreases as a whole and, as a result, the high voltage $E_{HT}$ being applied to the anode 835 is about to begin increasing. At this moment, the DC current flowing in the primary winding 812 of the saturable reactor 811 decreases in proportion to the anode current or the beam current. Accordingly the inductance $L_X$ of the secondary winding 813 of the saturable reactor 811 increases, and the combined inductance $L'_y$ of the inductance $L_X$ and inductance $L_y$ of the horizontal deflecting coils 810 connected in parallel with the inductance $L_X$ is increased. Consequently, $i'_{PF}$ and $f'_r$ are decreased according to Equations 5 and 6. Thus the pulse voltage $V'_{CP}$ takes a decreasing turn according to Equation 7. The decrement of this pulse voltage $V'_{CP}$ is applied to the anode 835 of the picture tube 834 to serve to hold down the increment of the high voltage whereby the high voltage is kept constant.

In the above high voltage stabilizing operation, the horizontal deflection current $i_{pp}$ is expressed by Equation 8, and the amount of variation in the combined current $i'_{pp}$ of the parallel circuit consisting of the horizontal deflecting coils 810 and the secondary winding 813 of the saturable reactor 811 is determined by the amount of variation in the current $i_X$ of the secondary winding 813. Therefore the value of the horizontal deflection current $i_{pp}$ is kept constant. Under the condition where the high voltage is kept constant, it is necessary to stabilize the horizontal deflection current $i_{pp}$ because, if $i_{pp}$ is varied, the picture amplitude will vary. As described above, the circuit of this invention does not bring about such picture amplitude variation, and it is evident that the picture amplitude will not be varied with respect to the vertical deflection as the high voltage is kept constant.

FIG. 14 is a characteristic diagram showing the relationship between the primary winding current and the secondary winding inductance of the saturable reactor 811 used for the embodiment of FIG. 13.

Figure 15:
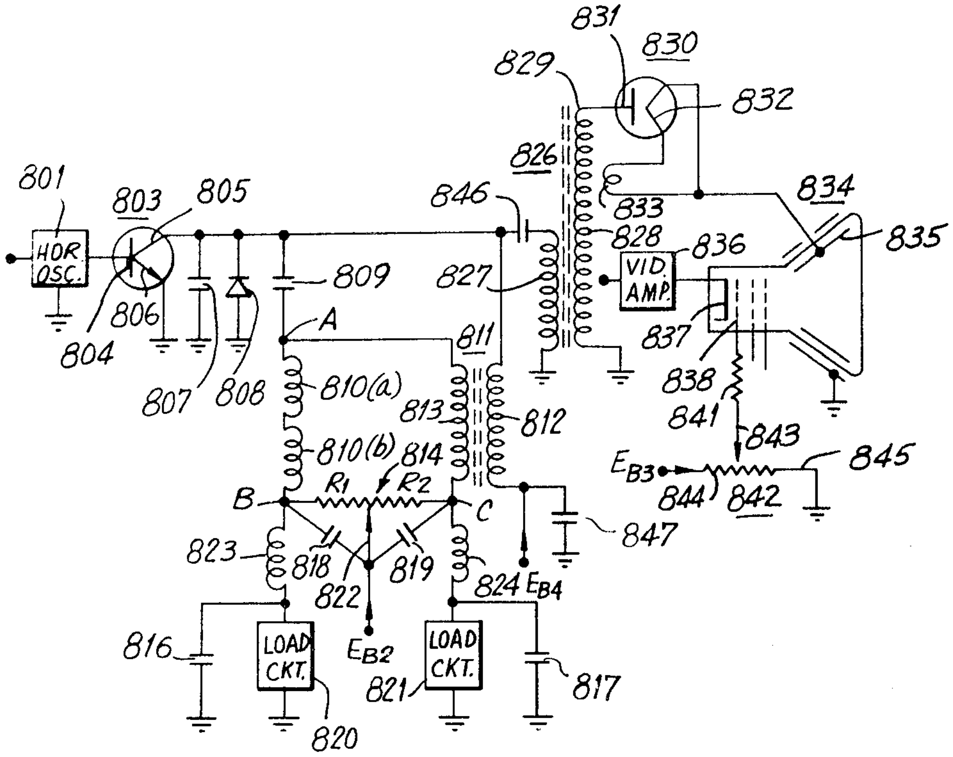
FIGS. 15 and 16 are schematic diagrams of additional circuits showing other embodiments of this invention.

FIG. 15 shows another embodiment of the invention, which differs from the embodiment of FIG. 13 in the following respects: The primary winding 812 of the saturable reactor 811 is connected in parallel with the flyback transformer 826 in the AC sense, and d-c current is supplied from a d-c source $E_{B4}$ to the horizontal output transistor 803 through the primary winding 812 of the saturable reactor 811.

In this arrangement, no d-c component will flow in the primary 827 of the flyback transformer 826 due to the capacitor 846. As a result, the core of the transformer 826 will not be magnetically saturated, and the transformer can be constructed with a small size. The capacitor 847 is for bypass use. The operation of this circuit is similar to that in FIG. 13.

Figure 16:
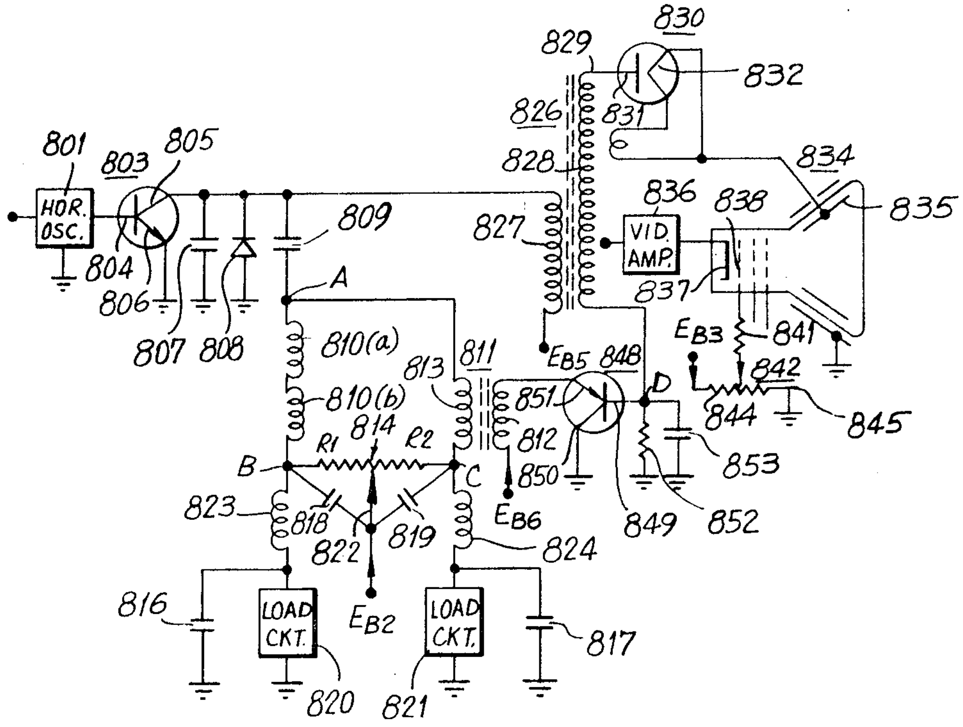

FIG. 16 shows another embodiment of the invention. This embodiment differs from the first embodiment in the following points. In the high voltage stabilizer circuit, d-c current is supplied to the horizontal output transistor 803 from the d-c source $E_{B5}$ by way of the primary winding 827 of the flyback transformer 826, and the d-c current flows in the primary winding 812 of the saturable reactor 811 not from the d-c source for the transistor 803 but from another d-c source $E_{B6}$. The DC current flowing through the primary winding 812 of the saturable reactor 811 is supplied to the emitter electrode 851 of the transistor 848. The lower terminal of the secondary winding 828 of the flyback transformer 826 is grounded via the parallel circuit consisting of a resistor 852 and a capacitor 853, and is connected to the base electrode 849 of the transistor 848. This resistor 852 operates to detect the anode current or the beam current of the picture tube 834. The variation in the anode current or beam current appears as a voltage component at the point D, and changes the base bias of the transistor 848. This serves to control the amount of current flowing in the primary winding 812 of the saturable reactor 811, and thus the high voltage is stabilized. The capacitor 853 is for bypass use.

According to the invention as has been explained, a resonant capacitor for S-characteristics compensation and a horizontal deflecting coil are connected in this order to the output electrode of the horizontal output element. A loop circuit is formed by leg portions which comprise a first leg portion including at least the horizontal deflecting coils, a second leg portion including at least a variable resistor and a third leg portion including at least the controlled winding of a saturable reactor. Two load circuits are connected to both terminals of the resistors in the d-c sense, and the brushes of the variable resistors are connected to a d-c source whereby a position adjusting circuit is constituted.

According to the last mentioned embodiments of the invention, a circuit is provided in which the amount of current flowing in the control winding of the saturable reactor is varied in response to the anode current or the beam current of the picture tube. The d-c current supplied to the horizontal output element via the flyback transformer or the current or the voltage of the flyback transformer is utilized to advantage. This current or voltage is varied in connection with the high voltage of the picture tube, and the inductance of the controlled winding inserted therein in parallel with the horizontal deflecting coils is varied whereby the high voltage is kept constant.

As illustrated in the last mentioned embodiments of the invention, the d-c current for use in positional adjustment is blocked by the resonant capacitor which is disposed for S-characteristics compensation. Accordingly, this d-c current does not flow in the horizontal output transistor, and a d-c current is supplied to this horizontal output transistor from another d-c source. By virtue of this arrangement, no d-c influence is exerted on the position adjusting circuit even if the d-c current flowing in the horizontal output transistor is varied. Thus stable picture positioning can be maintained at all times. Furthermore, because the flyback transformer of this invention is not bifilar the construction of this transformer can be simplified, and a small position adjusting variable resistor ranging, for example, from 5 to 10 ohms will suffice. This means that a small voltage variation dependent on a small variable resistance range is adequate for the purposes of the circuit of this invention. In addition, since this position adjusting variable resistor can be operated at around 100V, no particular arrangement is needed for insulative considerations thereof.

What is claimed is:

1. A television circuit for use with a picture tube including a screen, circuit comprising:

signal generation means generating at least one deflection signal for the production of a picture on the screen of said picture tube;

a first d-c source;

a loop coupled to said signal generation means and including leg portions connected in series therein, said source being outside of said loop, a first one of said leg portions including deflection coil means operatively associated with said picture tube and responsive to the signal of said signal generation means for controlling, at least in part, the production of a picture on said tube, a second one of said leg portions comprising variable resistor means including resistance means connected in series in said loop and a displaceable contact engaged with said resistance means and connecting said first d-c source to said loop for controlling the magnitude and direction of flow of the direct current through said deflection coil means whereby the location of the picture on said tube is controlled;

and a load circuit coupled to said loop for shunting direct current to effect the control of said picture location.

2. A circuit as claimed in claim 1 wherein said signal generation means is a source of a horizontal deflection signal.

3. A circuit as claimed in claim 1 wherein said signal generation means is a source of a vertical deflection signal.

4. A circuit as claimed in claim 2 wherein said load circuit is a vertical deflection circuit.

5. A circuit as claimed in claim 1 wherein said load circuit is an audio output circuit.

6. A circuit as claimed in claim 1 comprising a fly-back transformer connected to said loop and including a plurality of windings; and a damper diode connected to said signal generation means for forming the deflector signal.

7. A circuit as claimed in claim 6 wherein said loop includes a third leg portion including a winding of said transformer connected in series in said loop.

8. A circuit as claimed in claim 6 wherein said loop includes a third leg portion including a choke coil connected in series therein and wherein said transformer is connected to but is outside said loop.

9. A circuit as claimed in claim 6 wherein said loop includes a third leg portion comprising a saturable reactor including a winding connected in series in said loop, and said transformer is connected to but is outside said loop.

10. A circuit as claimed in claim 1 wherein said second leg portion of said loop includes a coil connected to said resistance means in series therein and to said load circuit.

11. A circuit as claimed in claim 1 comprising a resistor connecting said load circuit to said loop; and a by-pass capacitor connected to said resistor for bypassing said load circuit.

12. A circuit as claimed in claim 1 comprising a capacitor connected to but outside said loop and in a series resonant circuit with said deflection coil means of said first leg portions.

13. A circuit as claimed in claim 12 comprising a fly-back transformer including a plurality of windings, said loop including a third leg portion connected in series therein and including a winding of said transformer, said circuit further comprising a bypass capacitor connected between said loop and ground at a junction of said second and third leg portions.

14. A circuit as claimed in claim 12 comprising a saturable reactor, said loop including a third leg portion connected in series therein and including said reactor, said circuit further comprising a bypass capacitor connected between said loop and ground at a junction of said second and third leg portions; and a fly-back transformer connected to but outside said loop.

15. A circuit as claimed in claim 1 comprising an output transformer including a first winding coupled to said signal generation means and a second winding included in said first leg portion in series in said loop and operatively associated with said first winding.

16. A circuit as claimed in claim 15 wherein said first winding of said transformer is connected directly to said second winding thereof at one junction of said first and second leg portions for shunting direct current to said signal generation means, and wherein further said load circuit is coupled to said loop at said another junction of said first and second leg portions, said circuit further comprising a bypass capacitor coupled to said loop at said one junction.

17. A circuit as claimed in claim 16 comprising a feed-back means including a coupling capacitor, a component of a deflection signal developed in said loop being fed to said signal generation means through said coupling capacitor to compensate deflection linearity.

18. A circuit as claimed in claim 7 comprising a high-voltage generation means including said flyback transformer and a high-voltage rectifier means for generating a high-voltage to apply to said picture tube; a brightness control means connected to said picture tube; and a diode connected between said displaceable contact and a junction of said second and third leg portions whereby said diode is conductive to compensate a picture location change occurring as a result of operation of said brightness control means, said load circuit being connected to a junction of said first and second leg portions.

19. A circuit as claimed in claim 8 comprising a high-voltage generation means including said fly-back transformer and a high voltage rectifier means for generating a high-voltage to apply to said picture tube; a brightness control means connected to said picture tube; and a diode connected between said displaceable contact and a junction of said second and third leg portion whereby said diode is conductive to compensate a picture location change occurring as a result of operation of said brightness control means, said load circuit being connected to a junction of said first and second leg portions.

20. A circuit as claimed in claim 9 comprising a high-voltage generation means including said fly-back transformer and a high-voltage rectifier means for generating a high-voltage to apply to said picture tube; a brightness control means connected to said picture tube; and a diode connected between said displaceable contact and a junction of said second and third leg portion whereby said diode is conductive to compensate a picture location change occurring as a result of operation of said brightness control means, said load circuit being connected to a junction of said first and second leg portions.

21. A circuit as claimed in claim 8 comprising; a capacitor connecting said signal generation means to said loop at a junction of said first and third leg portions and in a series resonant circuit with said deflection coil means; and another load circuit coupled to said loop at a junction of said second and third leg portions for shunting direct current therefrom, first said load circuit being coupled to said loop at a junction of said first and second leg portions.

22. A circuit as claimed in claim 21 comprising bypass capacitors connected respectively between said displaceable contact and said junctions.

23. A circuit as claimed in claim 9 comprising a capacitor connecting said signal generation means to said loop at a junction of said first and third leg portions and in a series resonant circuit with said deflection coil means; and another load circuit coupled to said loop at a junction of said second and third leg portions for shunting direct current therefrom, first said load circuit being coupled to said loop at a junction of said first and second leg portions.

24. A circuit as claimed in claim 23 comprising bypass capacitors connected respectively between said displaceable contact and said junctions.

25. A circuit as claimed in claim 15 wherein said signal generation means includes interconnected transistors, one of said transistors applying said deflection signal to said first winding of said output transformer, another of said transistors driving said one transistor, said loop including a third leg portion including a resistor, which is connected to said other transistor at a junction of said first and third leg portions for the feeding of a component of said delection signal and for shunting direct current to said other transistor; said load circuit being coupled to said loop at a junction of said first and second leg portions; said circuit further comprising another load circuit coupled to said loop at a junction of said second and third leg portions for shunting direct current; and a second DC source connected to said one transistor via said first winding of said transformer.

26. A circuit as claimed in claim 25 comprising a bypass capacitor connected across said resistance means.

27. A circuit as claimed in claim 25 comprising coils connected respectively between said loop and load circuits for suppressing said deflection signal applied to said load circuits; and further bypass capacitors connected respectively to said coils for bypassing said load circuits.

28. A circuit as claimed in claim 23 comprising a high-voltage generation means including said flyback transformer and a high-voltage rectifier means for generating a high-voltage to apply said picture tube, said saturable reactor including a further winding outside said loop for controlling the inductance in the first said winding to compensate picture size changes.

29. A circuit as claimed in claim 28 comprising a second DC source connected to said further winding of said reactor for flowing direct current therethrough to said signal generation means.

30. A circuit as claimed in claim 28 wherein said further winding of said reactor is connected to a winding of said transformer in series, said circuit further comprising a second d-c source connected to said signal generation means by means of said further winding of said reactor and said winding of said transformer for supplying direct current therethrough to said signal generation means.

31. A circuit as claimed in claim 30 comprising a bypass capacitor connected across said further winding of said reactor.

32. A circuit as claimed in claim 24 comprising coils connected respectively between said loop and load circuits; and further bypass capacitors connected respectively to said coils for bypassing respectively said load circuits.

33. A circuit as claimed in claim 28 comprising bypass capacitors connected respectively between said displaceable contact and said junctions of said leg portions; coils connected respectively between said loop and load circuits; and further capacitors connected respectively to said coils for bypassing respectively said load circuits.

34. A circuit as claimed in claim 29 wherein said further winding of said reactor is connected directly to said signal generation means at one junction, said circuit further comprising a coupling capacitor connecting said signal generation means to a winding of said transformer.

35. A circuit as claimed in claim 34 comprising a bypass capacitor connected to further winding of said reactor for bypassing said second DC source.

36. A circuit as claimed in claim 28 wherein said transformer includes first and second windings, said circuit further comprising a second DC source connected to said signal generation means by means of a winding of said transformer; a resistor connecting the latter said winding of said transformer to ground for detecting the beam current of said picture tube; a transistor including base, collector and emitter electrodes, said base electrodes being connected to a junction of said resistor and said winding of said transformer, one of said collector and emitter electrodes being connected to said further winding of said reactor, another of said collector and emitter electrodes being connected to a basic potential; and a third d-c source connected to said further winding of said reactor for flowing direct current therethrough to be controlled by said transistor.

37. A circuit as claimed in claim 36 comprising a bypass capacitor connected to said second winding of said transformer for bypassing said resistor.

38. A circuit as claimed in claim 24 comprising brightness control means connected to one of electrodes in said picture tube; rectifying means responsive to changes in the beam current of said picture tube; and current control means connected to said rectifying means for controlling direct current in said further winding of said reactor to change inductance in said first winding thereof whereby the picture size changes occurring as a result of operation of the brightness control means are compensated.

39. A circuit as claimed in claim 28 comprising brightness control means connected to one of the electrodes in said picture tube; rectifying means responsive to changes in current in proportion to the beam current of said picture tube; and current control means connected to said rectifying means for controlling direct current in said further winding of said reactor to change inductance in said first winding thereof whereby the picture size changes occurring as a result of operation of said brightness control means are compensated.

40. A circuit as claimed in claim 28 comprising brightness control means connected to one of the electrodes in said picture tube; rectifying means responsive to changes in voltage in proportion to the high voltage applied to said picture tube; and current control means connected to said rectifying means for controlling direct current in said further winding of said reactor to change inductance in said first winding thereof whereby the picture size changes occurring as a result of operation of said brightness control means are compensated.

41. A circuit as claimed in claim 7 comprising a high-voltage generation means including said fly-back transformer and a high-voltage rectifier means for generating a high-voltage to apply to said picture tube; a brightness control means connected to said picture tube; and a diode connected to said displaceable contact and across a part of said resistance means divided by said displaceable contact whereby said diode is conductive to compensate a picture location change occurring as a result of operation of said brightness control means.

42. A circuit as claimed in claim 8 comprising a high-voltage generation means including said fly-back transformer and a high-voltage rectifier means for generating a high-voltage to apply to said picture tube; a brightness control means connected to said picture tube; and a diode connected to said displaceable contact and across a part of said resistance means divided by said displaceable contact whereby said diode is conductive to compensate a picture location change occurring as a result of operation of said brightness control means.

43. A circuit as claimed in claim 9 comprising a high-voltage generation means including said fly-back transformer and a high-voltage rectifier means for generating a high-voltage to apply to said picture tube; a brightness control means connected to said picture tube; and a diode connected to said displaceable contact and across a part of said resistance means divided by said displaceable contact whereby said diode is conductive to compensate a picture location change occurring as a result of operation of said brightness control means.

* * * * *

UNITED STATES PATENT OFFICE
CERTIFICATE OF CORRECTION

Patent No. 3,733,513 Dated May 15, 1973

Inventor(s) Sadayoshi Yoshikawa and Hiroshi Kawamura

It is certified that error appears in the above-identified patent and that said Letters Patent are hereby corrected as shown below:

ASSIGNEE: Change "Hunt Electronics Company, Dallas, Texas to --New Nippon Electric Company Ltd., Osaka, Japan--

Signed and sealed this 17th day of September 1974.

(SEAL)
Attest:

McCOY M. GIBSON JR.
Attesting Officer

C. MARSHALL DANN
Commissioner of Patents